US012586346B2

(12) United States Patent
Kocamaz et al.

(10) Patent No.: US 12,586,346 B2
(45) Date of Patent: Mar. 24, 2026

(54) MULTI-SENSOR OBJECT FUSION AND TRACKING FOR AUTONOMOUS SYSTEMS AND APPLICATIONS

(71) Applicant: NVIDIA CORPORATION, Santa Clara, CA (US)

(72) Inventors: Mehmet Kemal Kocamaz, San Jose, CA (US); Parthiv Parikh, San Jose, CA (US); Baris Evrim Demiroz, Campbell, CA (US); Sangmin Oh, San Jose, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 309 days.

(21) Appl. No.: 18/334,285

(22) Filed: Jun. 13, 2023

(65) Prior Publication Data

US 2024/0420449 A1     Dec. 19, 2024

(51) Int. Cl.
*G06V 10/74*      (2022.01)
*G06V 10/86*      (2022.01)

(52) U.S. Cl.
CPC ............ *G06V 10/761* (2022.01); *G06V 10/86* (2022.01)

(58) Field of Classification Search
CPC .............................. G06V 10/761; G06V 10/86
USPC .......................................................... 382/131
See application file for complete search history.

(56) References Cited

PUBLICATIONS

Liu, Kai, et al. "Cooperative sensing and uploading for quality-cost tradeoff of digital twins in VEC." IEEE Transactions on Consumer Electronics 70.1 (2023): 3614-3625. (Year: 2023).*

* cited by examiner

*Primary Examiner* — Jonathan S Lee
(74) *Attorney, Agent, or Firm* — Squire Patton Boggs LLP; Sarah Mirza

(57) ABSTRACT

In various examples, a technique for low-latency fusion and tracking of objects from multiple cameras is disclosed that includes determining a plurality of input objects and corresponding object characteristics, individual input objects and respective object characteristics being determined based at least on an image generated using a respective camera. The technique also includes identifying at least one subset of the plurality of input objects, the at least one subset corresponding to a respective physical object and comprising at least one input object that satisfies a similarity criterion. The technique further includes generating an output object associated with one or more smoothed object characteristics, the output object being generated based at least on two or more input objects included in the at least one subset of the plurality of input objects. The at least one subset corresponds to a physical object that is visible to two or more cameras.

20 Claims, 14 Drawing Sheets

Camera A Image 310

Detected Object 318

Detected Object 314

Detected Object 316

Detected Object 312

206A
Camera A Input Object IDs: 312, 314, 316, 318

Camera C Image 330

Detected Object 338

Detected Object 336

206C
Camera C Input Object IDs: 336, 338

Camera B Image 320

Detected Object 324

Detected Object 326

Detected Object 322

206B
Camera B Input Object IDs: 322, 324, 326

Example Objects 301

| Physical Object | Camera ID | Camera-Specific Object ID |
|---|---|---|
| 302 | A | 312 |
| 302 | B | 322 |
| 304 | A | 314 |
| 304 | B | 324 |
| 306 | A | 316 |
| 306 | B | 326 |
| 306 | C | 336 |
| 308 | A | 318 |
| 308 | C | 338 |

Figure 7D:
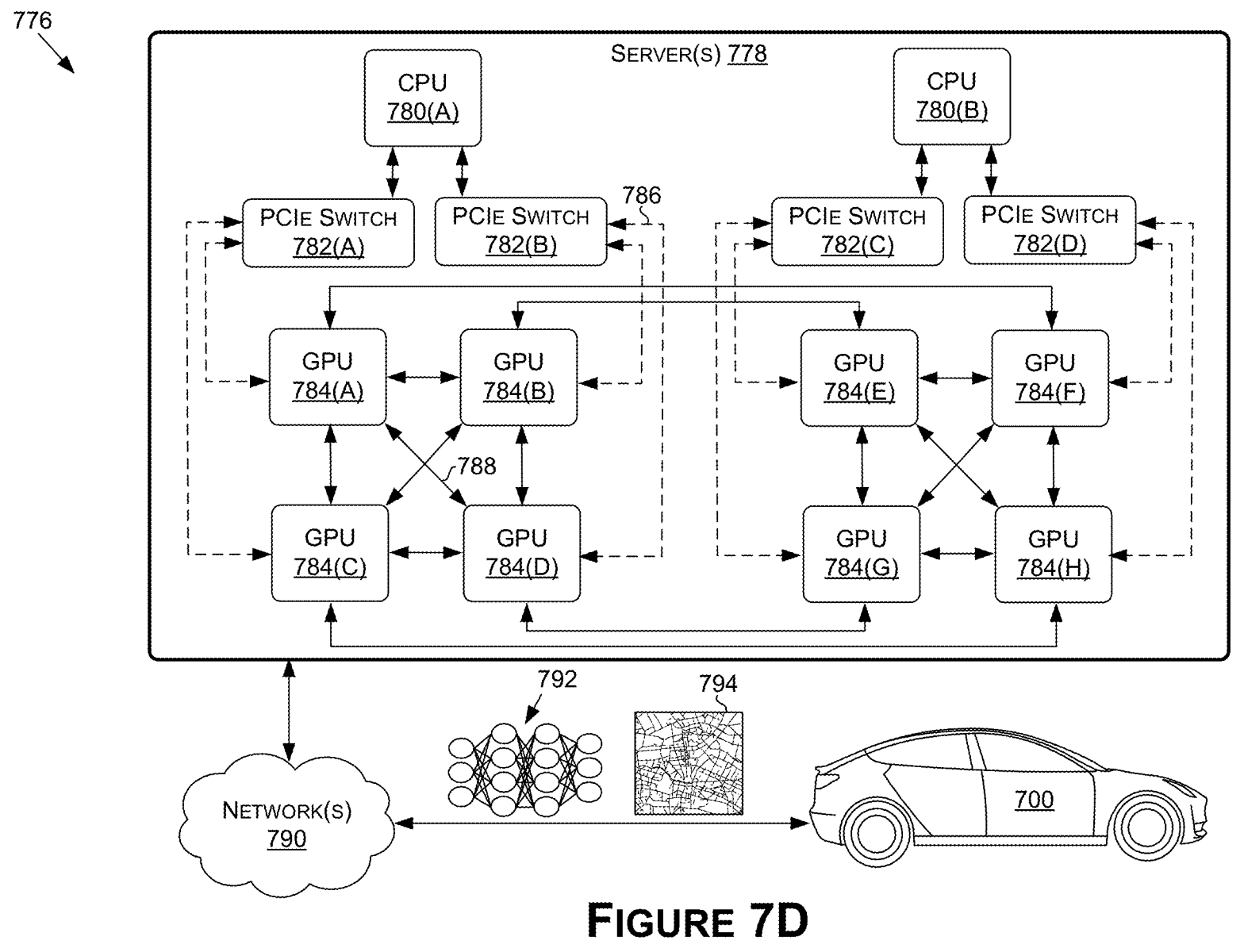

776

SERVER(S) 778

CPU 780(B)

CPU 780(A)

PCIe SWITCH 782(D)

PCIe SWITCH 782(C)

PCIe SWITCH 782(B)

PCIe SWITCH 782(A)

GPU 784(F)

GPU 784(H)

GPU 784(E)

GPU 784(G)

GPU 784(B)

GPU 784(D)

GPU 784(A)

GPU 784(C)

786

788

794

792

700

NETWORK(S) 790

MULTI-SENSOR OBJECT FUSION AND TRACKING FOR AUTONOMOUS SYSTEMS AND APPLICATIONS

BACKGROUND

An autonomous or semi-autonomous vehicle or machine is equipped with a perception system that tracks objects in a three-dimensional (3D) environment surrounding the vehicle or machine. Using this information, the perception system may generate object tracking information using, for example, images and/or other sensor data representations (e.g., point clouds) captured using a set of sensors. Since each camera or sensor type provides a different partial view of the environment, there may be differences in object information gathered from different sensors.

Various approaches, referred to as multi-camera fusion approaches, have been implemented to track objects using multiple cameras or other sensors. In multi-camera fusion approaches, a tracker component receives information generated from multiple cameras and combines information to form a list of tracked objects while resolving conflicts or other inconsistencies in the information. Accurate object tracking is relied upon for vehicle or other machine operations such as distance-to-object predictions and object velocity estimations. Accurate object tracking also mitigates errors such as missed or false positive object detections, and prevents errors from propagating into downstream planning and control functions of the autonomous or semi-autonomous vehicle.

Camera fusion approaches can be categorized as low-level fusion, mid-level fusion, or high-level fusion. In lower-level approaches, the tracker component generally performs lower-level tasks, such as extracting features from images, that are performed externally to the tracker component in higher-level approaches. In mid-level fusion approaches, each camera is associated with a perception pipeline that includes a Deep Neural Network (DNN). The DNN generates a list of detected objects for each camera image externally to a mid-level tracker. The mid-level tracker receives the list of detected objects and characteristics for each camera image from the pipeline, determines particular temporal characteristics of the detected objects, and fuses the lists of detected objects to form a single list of tracked objects. To reduce errors such as false positives in object detection, low-level and mid-level fusion approaches wait while multiple frames of camera input are processed by the DNN. However, waiting for multiple frames in this way may increase the latency of the perception system.

In high-level fusion approaches, a DNN external to the tracker generates a list of detected objects for each camera image externally to a high-level tracker, similarly to mid-level approaches. However, in high-level approaches, the perception pipeline determines additional object characteristics, such as the temporal characteristics determined by the tracker in mid-level fusion approaches. High-level fusion approaches can increase latency in producing object characteristics because of filtering in the high-level tracker that is performed in addition to filtering that occurs in the perception pipeline. High-level fusion approaches can also increase latency in the reporting of object existence to other vehicle systems, such as automated planning and control. In addition, high-level fusion approaches can increase latency by waiting for multiple frames of camera input to be processed by the DNN in the perception pipeline, as described herein for low and mid-level fusion approaches. Thus, each of the existing multi-camera fusion approaches may introduce latency into the perception system, which may result in delays in the availability of output and thus the reaction time. As such, the perception system may not perform object tracking as well as desired when processing input from multiple cameras.

As such, a need exists for more effective techniques for improving the performance of object tracking that uses input from multiple cameras or other sensors in autonomous or semi-autonomous systems and applications.

SUMMARY

Embodiments of the present disclosure relate to low-latency fusion and tracking of objects from multiple sensors. The techniques described herein include determining a plurality of input objects and corresponding object characteristics, individual objects and respective object characteristics being determined based on an image generated using a respective camera or other sensor modality. The techniques also include identifying at least one subset of the plurality of input objects, where individual subsets comprise one or more input objects included in the plurality of input objects that satisfy a similarity criterion. The techniques further include generating an output object based on at least two or more input objects included in the at least one subset of the plurality of input objects. The given subset corresponds to a physical object that is visible to two or more cameras, where one or more characteristics of the output object are based on historical data associated with each input object that is in the given subset. The techniques further include providing the output object to one or more components of a machine.

One technical advantage of the disclosed techniques relative to the prior approaches is the ability to output object tracking information with low latency in the common case of an object being in a non-overlapping region. The object tracking information also indicates the appearance and/or disappearance of an object with low latency. For objects that are in regions where cameras do overlap, the disclosed techniques also output object tracking information with low latency by using an efficient smoothing operation that averages the object characteristics received from multiple cameras based on the state information. These low-latency operations reduce reaction time for objects in the vehicle environment and can provide increased safety relative to existing techniques. Further, since substantial processing resources are devoted to perception pipelines, later points in the pipelines are more likely to have fewer errors, so the disclosed techniques can reliably use the results produced by the DNN without waiting for multiple frames to be passed through the DNN.

BRIEF DESCRIPTION OF THE DRAWINGS

The present systems and methods for generating object tracking information based on input objects received from multiple sensors in autonomous or semi-autonomous systems and applications are described in detail below with reference to the attached drawing figures, wherein:

FIG. 7D is a system diagram for communication between cloud-based server(s) and the example autonomous vehicle of FIG. 7A, in accordance with some embodiments of the present disclosure;

DETAILED DESCRIPTION

Figure 1:
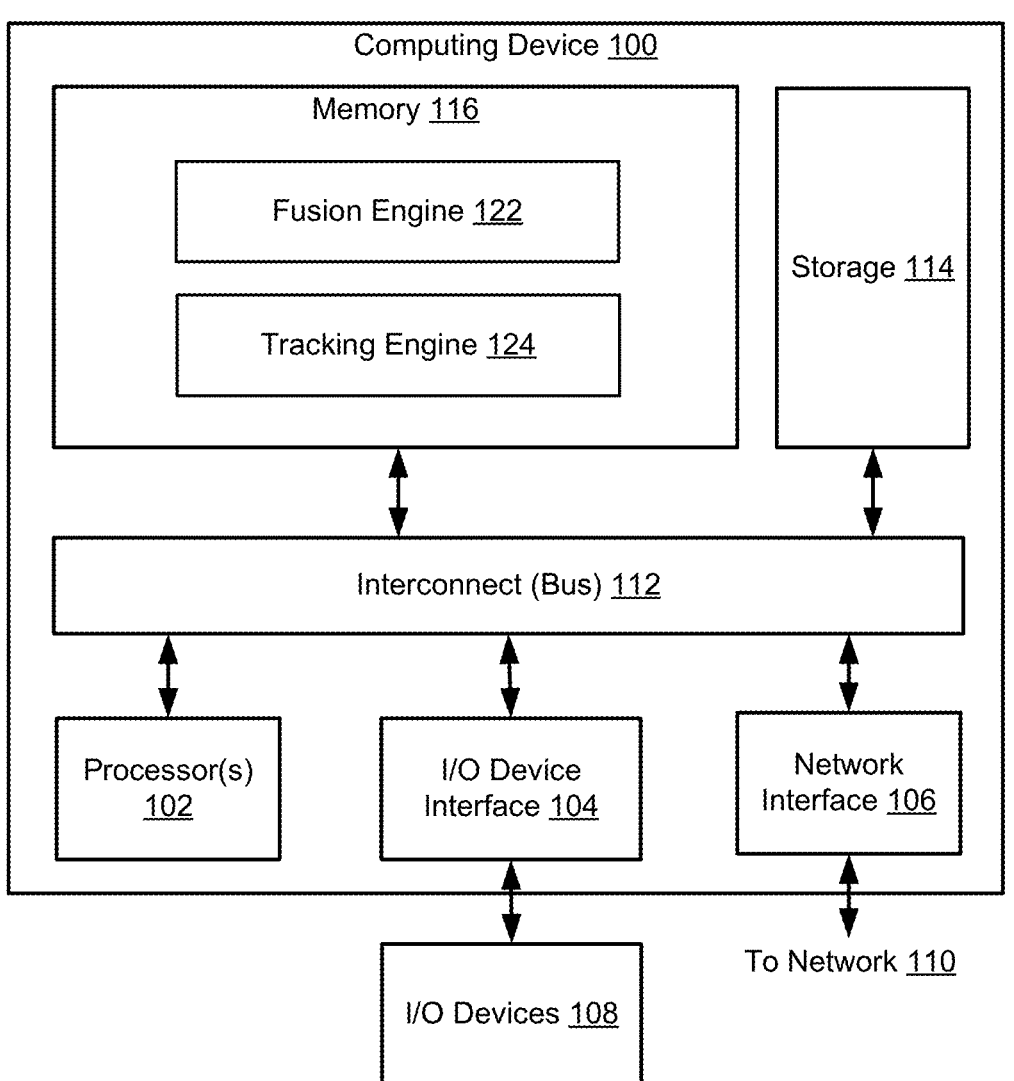
FIG. 1 illustrates a computing device configured to implement one or more aspects of various embodiments.

Systems and methods are disclosed for low-latency fusion and/or tracking of objects from multiple sensors. Although the present disclosure may be described with respect to an example autonomous or semi-autonomous vehicle or machine 700 (alternatively referred to herein as "vehicle 700" or "ego-machine 700," an example of which is described with respect to FIGS. 7A-7D), this is not intended to be limiting. For example, the systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to monitoring sensor performance in autonomous and/or semi-autonomous vehicles, this is not intended to be limiting, and the systems and methods described herein may be used in augmented reality, virtual reality, mixed reality, robotics, security and surveillance, autonomous or semi-autonomous machine applications, and/or any other technology spaces where sensor monitoring may be used.

The systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing, and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems implementing one or more language models-such as one or more large language models (LLMs) that may process text, audio, and/or image data, systems for performing light transport simulation, systems for performing collaborative content creation for 3D assets, systems implemented at least partially using cloud computing resources, and/or other types of systems.

With reference to FIG. 1, FIG. 1 illustrates a computing device 100 configured to implement one or more aspects of various embodiments. In at least one embodiment, computing device 100 includes a desktop computer, a laptop computer, a smart phone, a personal digital assistant (PDA), a tablet computer, a server, one or more virtual machines, an embedded system, a system on a chip, a computing system of an autonomous, semi-autonomous, and/or a non-autonomous machine, and/or any other type of computing device configured to receive input, process data, and optionally display images, and is suitable for practicing one or more embodiments. Computing device 100 is configured to run a fusion engine 122 and a tracking engine 124 that may reside in a memory 116. It is noted that the computing device described herein is illustrative and that any other technically feasible configurations fall within the scope of the present disclosure. For example, multiple instances of fusion engine 122 and/or tracking engine 124 may execute on a set of nodes in a distributed and/or cloud computing system to implement the functionality of computing device 100. Alternatively, computing device 100 may be implemented similar to that of the computing device of the example autonomous or semi-autonomous machine 700 described at least with respect to FIGS. 7A-7D.

In at least one embodiment, computing device 100 includes, without limitation, an interconnect (bus) 112 that connects one or more processors 102, an input/output (I/O) device interface 104 coupled to one or more input/output (I/O) devices 108, memory 116, a storage 114, and/or a network interface 106. Processor(s) 102 may include any suitable processor implemented as a central processing unit (CPU), a graphics processing unit (GPU), an application-specific integrated circuit (ASIC), a field programmable gate array (FPGA), an artificial intelligence (AI) accelerator, a deep learning accelerator (DLA), a parallel processing unit (PPU), a data processing unit (DPU), a vector or vision processing unit (VPU), a programmable vision accelerator (PVA), any other type of processing unit, or a combination of different processing units, such as a CPU(s) configured to operate in conjunction with a GPU(s). In general, processor(s) 102 may include any technically feasible hardware unit capable of processing data and/or executing software applications. Further, in the context of this disclosure, the computing elements shown in computing device 100 may correspond to a physical computing system (e.g., a system in a data center or a machine) and/or may correspond to a virtual computing instance executing within a computing cloud.

In at least one embodiment, I/O devices 108 include devices capable of receiving input, such as a keyboard, a mouse, a touchpad, a VR/MR/AR headset, a gesture recognition system, a steering wheel, mechanical, digital, or touch sensitive buttons or input components, and/or a microphone, as well as devices capable of providing output, such as a display device, haptic device, and/or speaker. Additionally, I/O devices 108 may include devices capable of both receiving input and providing output, such as a touchscreen, a universal serial bus (USB) port, and so forth. I/O devices 108 may be configured to receive various types of input from an end-user (e.g., a designer) of computing device 100, and to also provide various types of output to the end-user of computing device 100, such as displayed digital images or digital videos or text. In some embodiments, one or more of I/O devices 108 are configured to couple computing device 100 to a network 110.

In at least one embodiment, network 110 is any technically feasible type of communications network that allows data to be exchanged between computing device 100 and internal, local, remote, or external entities or devices, such as a web server or another networked computing device. For example, network 110 may include a wide area network (WAN), a local area network (LAN), a wireless (e.g., WiFi) network, a cellular network, and/or the Internet, among others.

In at least one embodiment, storage 114 includes non-volatile storage for applications and data, and may include fixed or removable disk drives, flash memory devices, and CD-ROM, DVD-ROM, Blu-Ray, HD-DVD, or other magnetic, optical, or solid-state storage devices. Fusion engine 122 and/or tracking engine 124 may be stored in storage 114 and loaded into memory 116 when executed.

In one embodiment, memory 116 includes a random-access memory (RAM) module, a flash memory unit, and/or any other type of memory unit or combination thereof. Processor(s) 102, I/O device interface 104, and network interface 106 may be configured to read data from and write data to memory 116. Memory 116 may include various software programs or more generally software code that can be executed by processor(s) 102 and application data associated with said software programs, including fusion engine 122 and/or tracking engine 124.

Fusion engine 122 and/or tracking engine 124 include functionality to generate object tracking information based on input objects received from multiple sensors, such as cameras, using low-latency operations. Since input objects are received from multiple cameras, two or more input objects may represent the same physical object as seen by different cameras. Fusion engine 122 performs three-dimensional (3D) sensor fusion operations that determine which input objects received from different cameras represent the same physical object. Fusion engine 122 generates one or more subsets of the input objects, such that each subset corresponds to a respective physical object and includes one or more input objects that represent the respective physical object. As such, each subset that contains two or more objects represents an association between the two or more objects. The association indicates that the two or more associated objects represent the same physical objects from different viewpoints. Fusion engine 122 generates the one or more subsets of the input objects by determining which of the input objects match each other according to a similarity criterion, and including the objects that match each other in a subset. The similarity criterion may be based on a cost function that quantifies the difference between each pair of input objects in the subset based on characteristics of the two objects in the pair.

The fusion engine 122 assigns the input objects to particular subsets in a way that minimizes a sum of costs determined by evaluating the cost function for a graph in which edges connect nodes that represent input objects. In a graph, the edges connect nodes that match each other according to a similarity criterion that is related to the cost function. Input objects that match each other more closely, e.g., are more similar, according to this similarity criterion are more likely to represent the same physical object in different camera views. Each input object subset thus corresponds to a physical object, and the fusion engine 122 identifies input object subjects such that each input object in an input object subset represents the same physical object. Each such input object subset contains one or more input objects that match each other according to the cost function. Accordingly, the input objects in a subset represent the same physical object according to comparisons between characteristics of the input objects. Each input object subset includes (e.g., includes identifiers of) input objects that match each other and thus represent the same physical object.

Tracking engine 124 performs object tracking operations that generate a set of output objects based on the input objects and/or images. Tracking engine 124 receives the subsets of input objects identified by the fusion engine 122, including characteristics of each input object, such as shape, position, velocity, acceleration, and/or the like. Tracking engine 124 stores the input objects, including their characteristics, as object state information in memory or other storage. Tracking engine 124 uses the subsets identified by the fusion engine 122 to generate one output object for each physical object. The output object thus represents a physical object that has been detected in one or more camera images from one or more respective cameras.

The object state information includes an object mapping table data structure, the current characteristics of each input object, and/or historical object characteristics for objects received in the past. Tracking engine 124 performs a smoothing operation on the object characteristics of input objects that represent the same physical object. For example, since each subset represents a distinct physical object, tracking engine 124 may average the characteristics of the input objects in each of the input object subsets to determine the object characteristics for each physical object. The tracking engine 124 generates an output object for each physical object. For example, the tracking engine 124 may generate an output object for each of the input object subsets, since each input object subset corresponds to a physical object. For subsets that contain a single input object, the output object can have the same characteristics as the input object. For subsets that contain multiple input objects, the output object can be generated using the smoothing operation described herein on the multiple input objects.

Figure 2:
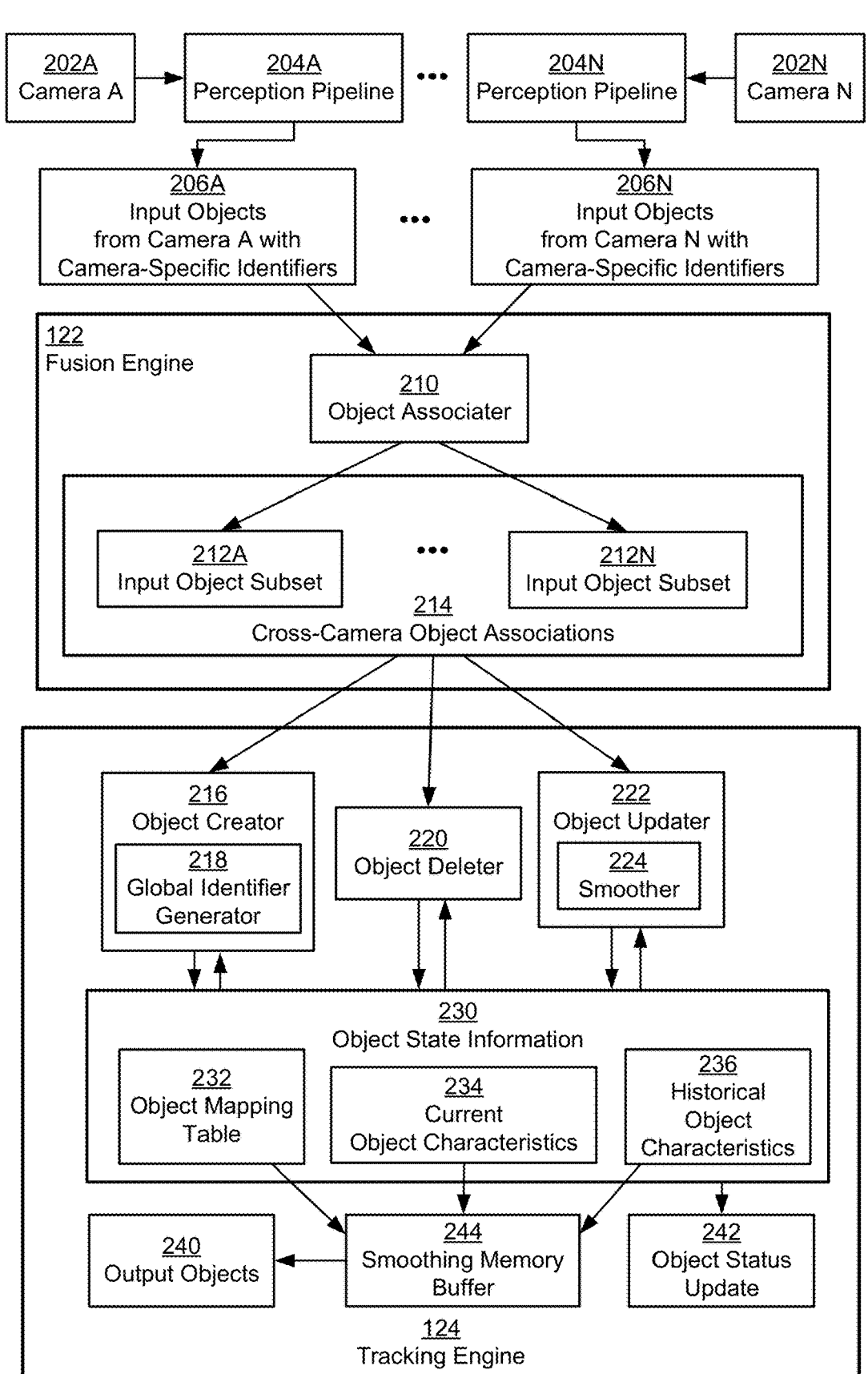
FIG. 2 is a more detailed illustration of the fusion engine and tracking engine of FIG. 1, according to various embodiments.

FIG. 2 is a more detailed illustration of fusion engine 122 and tracking engine 124 of FIG. 1, according to various embodiments. As described herein, fusion engine 122 and/or tracking engine 124 operate to perform three-dimensional (3D) sensor fusion and/or object tracking operations that generate a set of output objects 240 based on input objects 206 from perception pipelines 204A and/or images from cameras 202.

Since multiple cameras are used to construct a view of the space surrounding the autonomous or semi-autonomous vehicle, and the fields of view of the cameras can overlap, the same physical object may be depicted in images from multiple cameras. Vehicle functions such as path planning functions receive the output objects 240 and operate on an assumption that each output object 240 represents a different physical object. Accordingly, fusion engine 122 identifies input objects 206 from different cameras 202 that represent the same physical object. Tracking engine 124 combines multiple input objects 206 that represent the same physical object into a single output object 240 and generates a set of output objects 240 that includes one output object for each physical object.

Fusion engine 122 receives one or more sets of input objects 206 from one or more perception pipelines 204. Each set of input objects 206 includes one or more input objects that a respective perception pipeline 204 identified in one or more camera images captured by a respective camera 202. Each camera 202 may be a stereo camera 768, a wide view camera 770, or other suitable camera or sensor. Fusion engine 122 performs three-dimensional (3D) sensor fusion operations that determine which of the input objects represent the same physical object, as described herein.

Fusion engine 122 incudes an object associator 210, which performs an object association operation that generates cross-camera object associations 214. The object associations 214 include one or more input object subsets 212. The object associator 210 generates the object associations 214 by partitioning the input objects 206 into subsets 212 based on comparisons between characteristics of the input objects 206. Each input object subset 212 contains one or more input objects 206 that represent the same physical object according to comparisons between characteristics of the input objects 206. The characteristics of the input objects may include shape, position, velocity, and/or acceleration, for example. The comparisons may use a similarity criterion to determine which input objects represent the same physical object. The similarity criterion may be based on a cost function that quantifies the difference between two input objects 206. For example, the cost function may produce a lower cost value for two input objects that represent the same physical object than for two input objects that represent different objects. Associator 210 may identify the input object subsets 212 using a cost optimization algorithm that evaluates the similarity between different input objects using the cost function.

Figure 5:
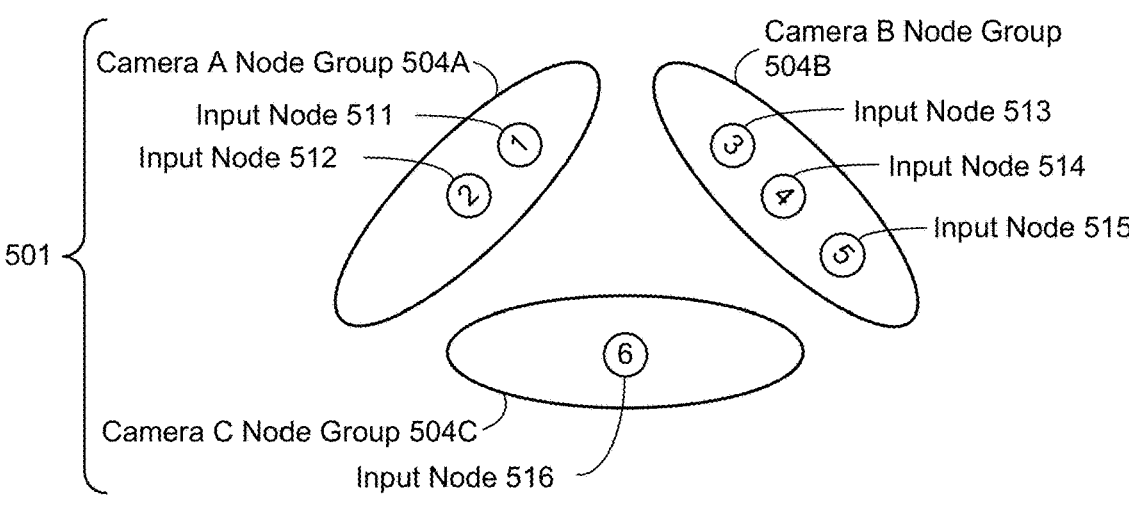
FIG. 5 illustrates an example of sensor fusion using a graph-based cost optimization algorithm to identify object associations across multiple sensors, according to various embodiments.
Figure 5:
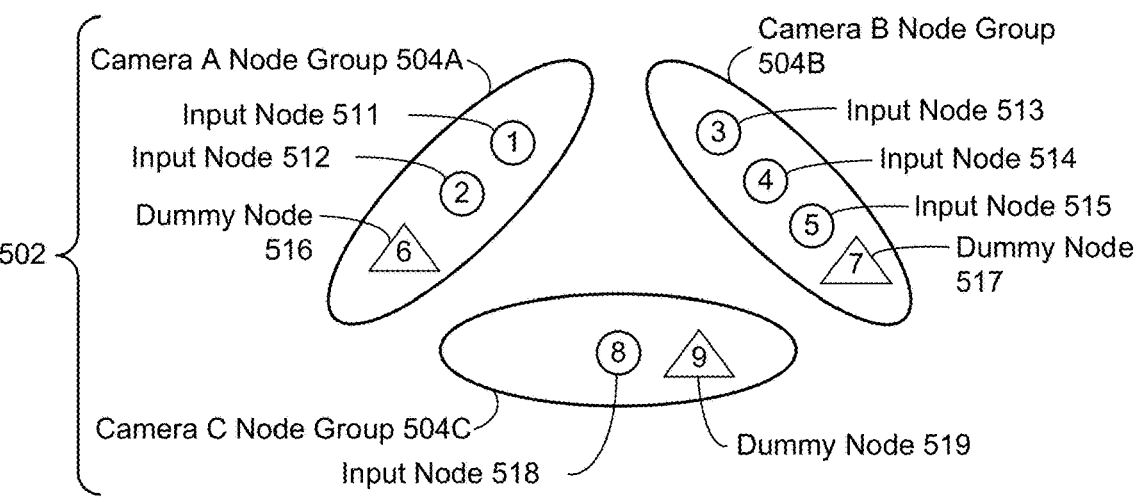
Figure 5:
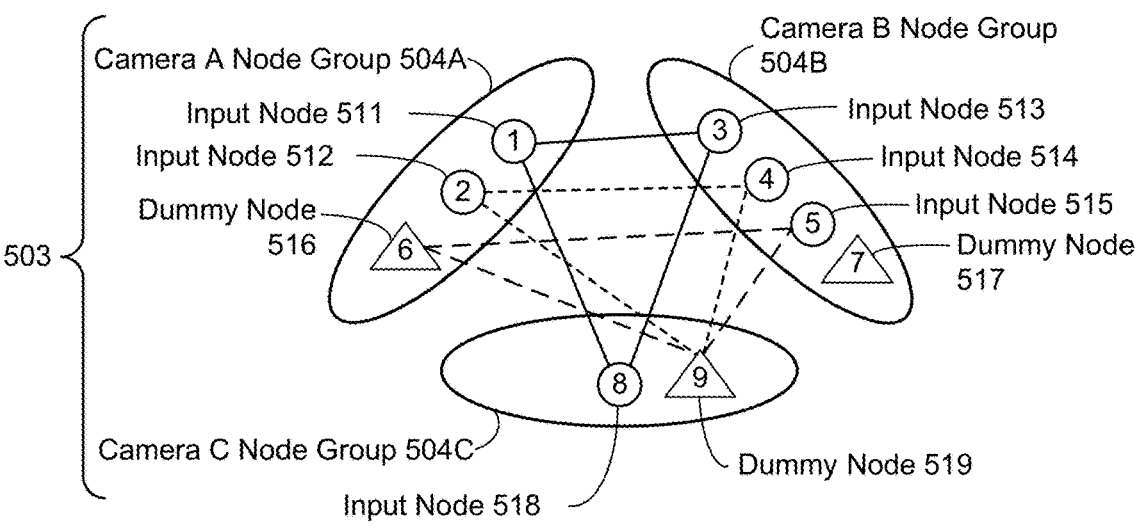

The object association algorithm identifies input object subsets 212 that correspond to the same physical object by using the cost optimization algorithm to identify a minimum-cost set of cliques of nodes in a graph. FIG. 5 shows an example graph 503. The graph 503 includes a set of nodes, each of which corresponds to an input object 206, and a set of edges, each of which connects two nodes. A clique is a graph in which each pair of nodes are connected. Each clique corresponds to a physical object. The object associator 210 divides the nodes into node groups 504, where each node group 504 corresponds to a camera 202. As such, each node group 504 includes nodes that represent the input objects 206 detected by a different camera 202. A physical object is not necessarily captured by every camera, so some node groups 504 may contain fewer objects than other groups 504. To enable calculation of a cost when a physical object is not captured by every camera 202, one or more "dummy nodes" are added to each node group that does not have a sufficient number of nodes to form an edge connection with each node in each of the other groups. After adding the dummy nodes, edges connecting each node to a node in each of the other groups are added to the graph 503. The cost optimization algorithm evaluates the costs of various cliques of the graph 503 that contain a node from each group 504. Each clique contains a set of nodes that represent a particular subset of the input objects 206 from a particular camera 202. Thus, each clique represents a candidate association between objects captured by different cameras 202 that corresponds to a particular physical object. The cost optimization algorithm identifies a minimum cost set of cliques in the graph 503, where the sum of the costs of the cliques is a minimum of the costs of possible sets of cliques of the graph 503. The cost of each clique is determined using a cost function. Each clique corresponds to a physical object. The presence of a dummy node in a clique indicates that the physical represented by the clique is not visible in the sensor represented by the node group 504 that contains the dummy node. Each clique in the minimum cost set of cliques contains a node for each camera 202 that captured an image of the same physical object. The cost optimization algorithm may calculate a cost for each edge based on a difference between characteristics of the input objects 206 represented by the nodes connected by the edge. The cost optimization algorithm addresses limitations in graph-based sensor fusion association algorithms that use a form of bipartite matching and are specialized to work for two cameras.

Tracking engine 124 performs object tracking by creating and/or updating object state information 230 based on received input objects 206. Each input object 206 is stored in memory, e.g., in object state information 230 by the tracking engine 124 or other component, such as a perception pipeline 204. Tracking engine 124 generates output objects 240 based on the input objects 206. Output objects 240 may include one output object for each physical object. For example, tracking engine 124 may receive each input object 206 subsequently to the input object 206 being assigned to an object subset 212 by object associator 210.

To generate output objects, tracking engine 124 iterates over the object subsets 212 (where each object subset 212 corresponds to a set of input objects having the same global object ID) and generates an output object for each object subset 212. For each object subset 212, tracking engine 124 identifies a highest-priority camera of the cameras associated with input objects in the subset. Each camera may have a default priority, e.g., a fixed priority value associated with the camera. Further, camera priority may be determined based on the scene. If an object is partially visible in one camera but completely visible in another camera, then a lower priority is assigned to the camera in which the object is partially visible, and a higher priority is assigned to the camera in which the object is completely visible. Camera priority may be determined based on characteristics of the camera and/or characteristics of the input object. A camera may be associated with a distance capability indicating whether the camera is suitable for capturing long distance, medium distance, or short distance objects. Camera priority may then be determined based on the distance capability of the camera and/or the distance of an input object. If the distance capability of a camera corresponds to the distance of an input object, then a high priority may be assigned to the camera. For example, a long-range camera may be assigned a high priority for an input object that is at a long distance from the camera, a medium priority for a camera that is at a medium distance from the camera, or a low priority for an object that is at a short distance from the camera.

To generate an output object 240 for an input object subset 212, tracking engine 124 identifies a highest-priority camera of the cameras associated with input objects in the input object subset 212. If the priority of the highest priority camera is substantially greater than the priority of any other camera associated with an input object in the subset 212, then tracking engine 124 generates an output object having the object characteristics of the input object associated with the highest-priority camera without performing smoothing. A first camera priority is substantially greater than a second camera priority if, for example, the first camera priority is greater than the second camera priority by a threshold amount or a threshold factor. If the priority of the highest priority camera is substantially greater than the priority of any other camera associated with an input object in the input object subset 212, then tracking engine 124 performs a smoothing operation on the input objects in the input object subset 212. The smoothing operation produces object characteristics for an output object based on a combination, e.g., average, of the characteristics of each of the input objects in the subset, as described herein.

The object state information 230 may include an object mapping table 232, current object characteristics 234 for each input object 206, and/or historical object characteristics 236 for previous input objects. Object characteristics for an input object may include a class, shape, position, velocity, and/or acceleration of the object, for example. Current object characteristics 234 may include the characteristics of each input object 206 detected in a current frame. The object mapping table 232, current object characteristics 234, and/or historical object characteristics 236 may each a data structure such as a lookup table, hash table, or other suitable data structure. Alternatively, object mapping table 232, current object characteristics 234, and/or historical object characteristics 236 may be combined in a single data structure.

Historical object characteristics 236 may include object characteristics of input objects 206 detected in previous frames but not in a current frame. Historical object characteristics 236 include object characteristics that were previously in the current object characteristics 236 but have been superseded by more recent input objects 206. Historical object characteristics 236 may include object characteristics received for objects up to a threshold amount of time in the past. Historical object characteristics 236 may include characteristics of objects that were previously included in the current characteristic but have been deleted and moved to historical object characteristics. The object mapping table 232 may contain identifiers of input objects 206 detected in the current frame from each camera 202. To generate the output objects 240, the tracking engine 124 combines the input objects 206 in each input object subset 212 (which represent the same physical object) using a smoothing technique. Thus, the smoothing technique generates, for each physical object, a single output object 240 having characteristics based on the characteristics of each input object 206 in the subset 212.

Upon receiving an input object 206, an object creator 216 component of tracking engine 124 queries the mapping table to determine whether an entry already exists in the object mapping table 232 for the input object. An entry in the mapping table 232 may be, for example, a row, record, or other suitable data item. An entry already exists for an input object 206 if a camera ID and a camera-specific ID associated with the input object 206 are present in the object mapping table 232. If an entry does not exist for the received input object 206, then object creator 216 creates an entry in the object mapping table 232 for the received input object 206. Object creator 216 generates a global object ID using a global identifier generator 218, which increments a counter value for each generated global object ID and provides the current counter value to the object creator 216 for use as a global object ID. Accordingly, the global object ID is unique across cameras and corresponds to a physical object.

Object creator 216 stores the global object ID, camera ID, and camera-specific object ID in an entry in the mapping table 232. Further, the tracking engine 124 can output an object status report 242 for the output object. The object status report 242 may be a report that the object has been created or a confirmation that the output object exists, for example.

If the query of the mapping table performed by the object creator 216 described herein determines that an entry including at least one of the (camera, camera-specific object ID) pairs already exists in the mapping table, then an object updater 222 of the tracking engine 124 performs an update operation that re-uses the global object ID already associated with that pair in the mapping table 232 instead of creating another entry for the received input object 212. The object updater 222 also stores object characteristics of the received input object 206 in the current object characteristics 234. The object characteristics may include an object class, object shape, object position, object velocity, and/or object acceleration, for example.

The object updater 222 updates object state information 230, including current object characteristics 234, based on each received input object 206. The object state information 230 can be updated based on the received input object 206 and/or other associated objects that represent the same physical object as the input object (if any). The received input object 206 is a member of an input object subset 212 generated by object associator 210. The input object subset 212 contains other input objects 206 that represent the same physical object as the received input object 206, if any such other input objects 206 exist.

To update the object state information 230, the object updater 222 identifies the input object 206 associated with the highest-priority camera of the input object(s) 206 in the input object subset 212. The highest-priority camera of the input object(s) 206 in the input object subset 212 is a camera having a priority greater than or equal to a priority of each of one or more other cameras, where each of the one or more other cameras is associated with one of the other input objects in the input object subset. If two or more cameras have the highest priority, then one camera of the two or more cameras having the highest priority, may be selected. The one camera selected when two cameras have the highest priority may be the camera having the highest priority and the lowest camera identifier, for example. The object updater 222 then copies characteristics of the identified input object 206 to a smoothing memory buffer 244. The object updater 222 identifies the highest-priority camera according to priority values associated with the cameras. For example, each camera on a vehicle may have an associated priority value. A long-range camera 202 that is better suited to capturing objects at long distances may have a higher priority value for distant objects than a short-range camera that is better suited to capturing objects as short distances. If the input object is at a long distance, then the long-distance camera 202 that is better suited to capturing object at long distances has the higher priority value, and the identified input object is the input object 206 associated with the long-distance camera 202. The object updater 222 then copies characteristics of the identified input object 206 to the memory buffer 244.

For some current object characteristics 234, such as object classification and/or object dynamic state, each camera produces the same values for each input object 206 that corresponds to the same physical object. As such, some current object characteristics are constant across the associated objects in an input object subset 212. For other characteristics, such as velocity, 3D position, and/or orientation, different cameras produce different values based on factors such as occlusion, number of frames since the object has been actively tracked, and/or camera properties. Thus, tracking engine 124 performs a smoothing operation on the input objects in each subset 212 to determine an estimate of the object characteristics of the physical object to which the subset 212 corresponds. The smoothing operation involves averaging the characteristics of the input objects 206 in an input object subset 212. The smoothing operation provides an accurate estimate of the characteristics of a physical object with low latency.

The object updater 222 determines whether to perform smoothing on the identified input object 206 associated with the highest-priority camera. The object updater 222 may determine that smoothing is to be performed if, for example, the physical object that the identified input object 206 corresponds to is visible in multiple cameras 202. The physical object is visible in multiple cameras if the subset from which the identified input object was selected contains more than one input object. As another example, the physical object is visible in multiple cameras if there is at least one other entry in the object mapping table 232 having the same global object ID as the input object 206. As still another example, the physical object that the input object 206 corresponds to is visible in multiple cameras if the global object ID of the input object 206 is associated with multiple sensors (e.g., is in images from multiple cameras 202) in a current frame and/or in historical frames captured by the sensors. For example, the object updater 222 may determine not to perform smoothing if the global object ID of input object 206 is associated with a single camera 202 in the mapping table 232. The object updater 222 may, however, determine that smoothing is to be performed if the global object ID of input object 206 is associated with multiple cameras 202 in the current mapping table.

If the object updater 222 determines that smoothing is to be performed, then the object updater 222 uses a smoother 224 to perform a smoothing operation. The smoothing operation generates a new output object 240. The smoothing operation averages the object characteristics of each of the associated objects, which include each of the other objects in the same input object subset 212 as the input object for which the smoothing operation is invoked. The average can be calculated over the associated objects in the current frame and/or over the associated objects in the current frame and up to a determined number of historical frames or up to a determined amount of time in the past (e.g., a specified number of historical frames). The characteristics for which averages are calculated can include position, velocity, and/or orientation. The tracking engine 124 can perform smoothing using the method of FIG. 6B, for example. The smoothing operation can use camera priorities to weight the input information from each perception pipeline based on a priority associated with the camera from which the perception pipeline receives images. The priority of each camera can be determined based on how well the camera performs for a specific category of objects, for example.

The tracking engine 124 includes an object deleter 220 that deletes each entry in the current object characteristics 234 that does not correspond to an input object 206. The object deleter 220 thus removes any entries in the current characteristics 234 for objects not seen in the current frame. Alternatively, the object deleter 220 may delete each entry in the current object characteristics 234 that has not been seen in a threshold number of previous frames, e.g., in the previous 5 or 10 frames. The object deleter 220 may store each entry deleted from the current object characteristics in the historical object characteristics 236. Further, the object deleter 220 may delete each entry in the historical object characteristics 236 that is older than a threshold age or was created or stored in the historical object characteristics 236 more than a threshold number of frames in the past.

The tracking engine 124 provides the output object 240 to one or more vehicle sub-systems, such as a planning subsystem. The tracking engine 124 can generate an output object 240 for each of the subsets 212 of input objects 206, since each subset 212 represents a distinct physical object. Each output object can include object characteristics by the smoothing operation. Since processing resources are devoted to the perception pipelines, and later points in the pipelines are more likely to have fewer errors, the disclosed techniques use the results produced by the DNN without waiting for multiple frames to be passed through the DNN. Further, the object associator 210 uses a low-latency cost optimization algorithm to perform sensor fusion for two or more sensors. The object creator 216, object deleter 220, and/or object updater 222 also use low-latency operations to perform object tracking.

It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous vehicle 700 of FIGS. 7A-7D, example computing device 800 of FIG. 8, and/or example data center 900 of FIG. 9.

Figure 3:
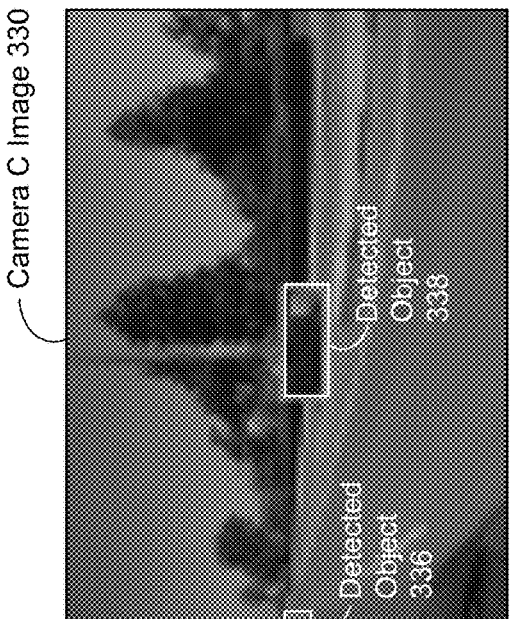
FIG. 3 illustrates example physical objects depicted in camera images from various viewpoints, according to various embodiments.

FIG. 3 illustrates example physical objects depicted in camera images 310, 320, 330 from various viewpoints, according to various embodiments. Each of the camera images depicts one or more physical objects, e.g., vehicles. Each camera image is captured by a camera 202 or other sensor located on an autonomous vehicle 700. A perception pipeline 204 uses a DNN or other suitable object detector to detect one or more objects in each image. The detected objects in the example of FIG. 3 represent four distinct example physical objects, which are referred to herein as physical objects 302, 304, 306, 308. An example objects table 301 lists the example physical objects and, for each physical object, a camera ID of a camera that captured an image of the physical object, and a camera-specific object ID assigned to the physical object, e.g., by a particular perception pipeline associated with the camera that captured the image. The physical object identifiers 302, 304, 306, 308 are used for explanatory purposes and are not necessarily provided to the fusion engine 122 or tracking engine 124.

Camera A image 310 is captured by Camera A 202A. A perception pipeline 204A generates, for each detected object in camera A image 310, an input object based on the detected object. The detected objects in camera A image 310 include detected objects 312, 314, 316, 318, each of which corresponds to a respective physical object 302, 304, 306, 308 depicted in camera A image 310. The perception pipeline 204A assigns input object IDs 206A having the values "312", "314", "316", and "318" to the respective detected objects 312, 314, 316, and 318.

Camera B image 320 is captured by Camera B 202B. A perception pipeline 204B generates, for each detected object in camera B image 320, an input object based on the detected object. The detected objects in camera B image 320 include detected objects 322, 324, 326, each of which corresponds to a respective physical object 302, 304, 306 depicted in camera B image 320. The perception pipeline 204B assigns input object IDs 206B having the values "322", "324", and "326" to the respective detected objects 322, 324, and 326.

Camera C image 330 is captured by Camera C 202C. A perception pipeline 204C generates, for each detected object in camera C image 330, an input object based on the detected object. The detected objects in camera C image 330 include detected objects 336, 338, each of which corresponds to a respective physical object 306, 308 depicted in camera C image 330. The perception pipeline 204C assigns input object IDs 206C having the values "336" and "338" to the respective detected objects 322 and 326.

As can be seen from images 310, 320, 330, a first physical object 302 is detected by cameras A and B, and designated as respective camera-specific object IDs "312", "322". Further, a second physical object 304 is detected by cameras A and B, and designated as respective camera-specific object IDs "314", "324". A third physical object 306 is detected by cameras A, B, and C, and designated as respective camera-specific object IDs "316", "326", and "336". A fourth physical object 308 is detected by cameras A, B, and C, and designated as respective camera-specific object IDs "318", "328", and "338".

Figure 4A:
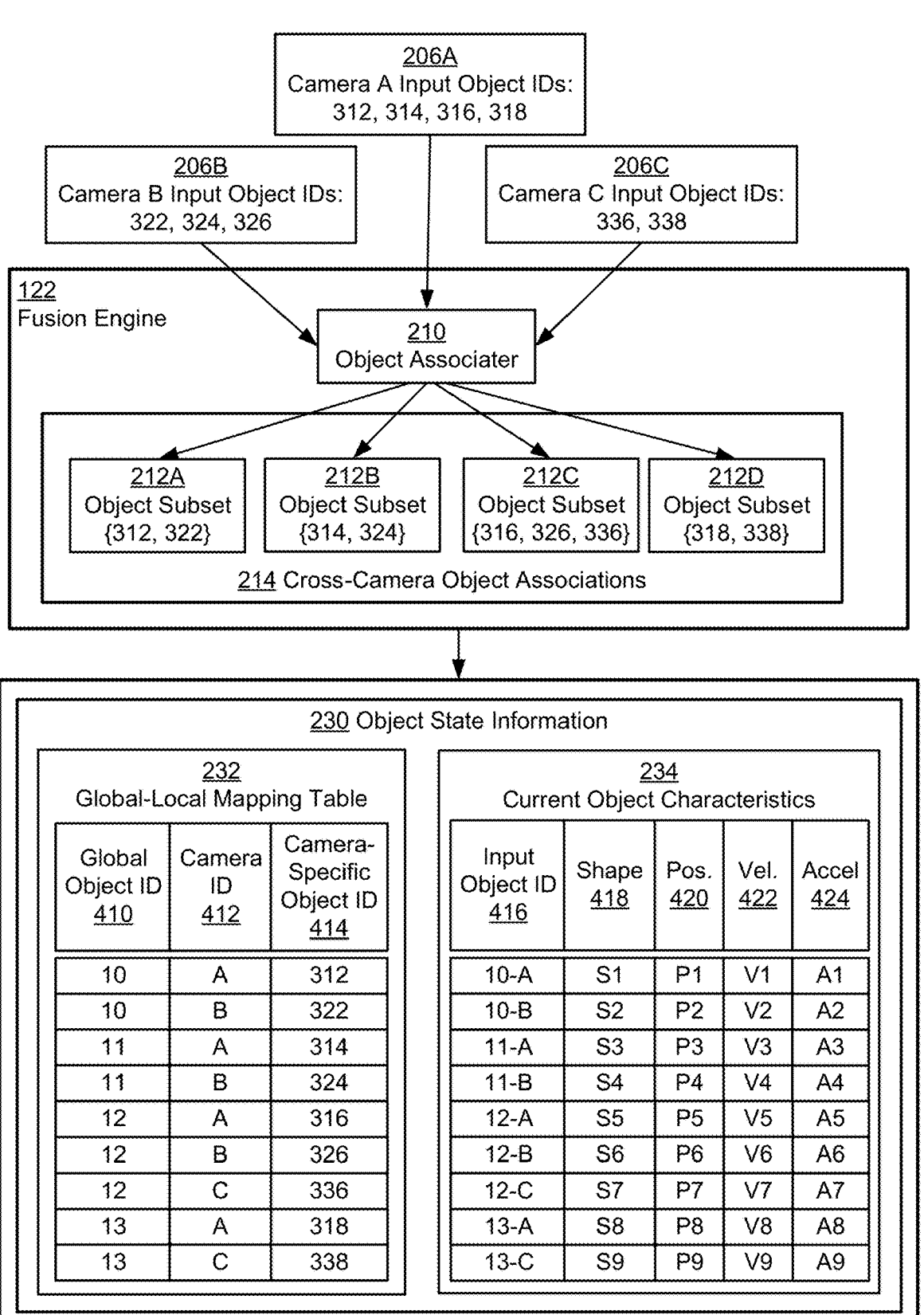
FIG. 4A illustrates example of object associations generated by a fusion engine and corresponding object state information generated by a tracking engine, according to various embodiments.

FIG. 4A illustrates example of object associations 214 generated by a fusion engine 122 and corresponding object state information 230 generated by a tracking engine 124, according to various embodiments. An object associator of the fusion engine 122 receives sets of input objects 206, as described herein with respect to FIG. 2. Input objects 206 may have been captured by cameras 202 in a current frame or in any other suitable period of time, e.g., captured in any of a specified number of recent frames or in a specified amount of time. A set of input objects 206 may include, for each input object in the set, a camera-specific input object identifier and object characteristics. For example, input objects 206A from camera A includes camera-specific object IDs "312", "314", "316", and "138" that identify input objects captured by camera A. Further, input objects 206B from camera B includes camera-specific object IDs "322", "324", and "326". Still further, input objects 206C from camera C includes camera-specific object IDs "336" and "338". Each set of input objects 206 may also include or reference object characteristics, such as a position, velocity, and/or orientation of each input object in input objects 206.

Object Associator 210 generates cross-camera object associations 214 based on input objects 206 received from cameras 202. The object associations 214 generated by object associator 210 include one or more object subsets 212. Each object subset 212 includes one or more camera-specific object IDs of input objects that represent a particular physical object. In the example of FIG. 4A, four input object subsets have been generated to represent the four distinct physical objects 302, 304, 306, 308 shown in the camera images of FIG. 3. Object subset 212A includes camera-specific object IDs 312 and 322, which represent physical object 302 as captured by cameras A and B, respectively. Object subset 212B includes camera-specific object IDs 314 and 324, which represent physical object 304 as captured by cameras A and B, respectively. Object subset 212C includes camera-specific object IDs 316, 326, and 336, which represent physical object 306 as captured by cameras A, B, and C, respectively. Object subset 212D includes camera-specific object IDs 318 and 338, which represent physical object 308 as captured by cameras B and C, respectively.

Tracking engine 124 generates object state information 230 based on the cross-camera object associations 214. The object state information 230 includes a global-local object mapping table 232, which includes an entry for each input object received from cameras 202 for a current input frame or other suitable period of time. Each, entry in the object mapping table 232 may be, e.g., a row or record, and includes a global object ID 410, a camera ID 412, and a camera-specific object ID 414. The global object ID 410 is an identifier generated by the tracking engine 124 for each object subset 212 identified by the object associator 210. Each global object ID 410 may uniquely identify a respective object subset 212 by having a value different from the object identifiers associated with the other object subsets 212. Different input objects that represent the same physical object have the same global object ID 410.

The entries in the object mapping table 232 are generated from the cross-camera object associations 214 by the tracking engine 124. Tracking engine generates one or more entries in the mapping table 232 for each object subset 212. For example, tracking engine 124 generates the first two entries in the object mapping table 232 based on the two elements of object subset 212A. As described herein, object subset 212A contains camera-specific ("local") object ID "312" from camera A and camera-specific object ID "322" from camera B. Tracking engine 124 generates a global object ID 410 of "10" for object subset 212A. Tracking engine 124 may generate the global object ID 410 by, for example, incrementing a counter when creating a mapping table entry for an object subset that does not already have an entry in the mapping table 232, for example.

Tracking engine 124 determines each camera-specific ID 414 from a respective input object ID specified in the input object subset 212, and determines each camera ID 412 from the camera ID of the camera that captured the respective input object. In this example, two mapping table entries are generated for object subset 212A: a mapping table entry based on input object ID 312 having global object ID=10, camera ID=A, and camera-specific object ID=312 (abbreviated as values (10, A, 312)), and mapping entry based on input object ID 322 having values (10, B, 322). Other entries shown in the object mapping table 232 are generated similarly. For example, two mapping table entries are generated for object subset 212B: a mapping table entry based on input object ID 314 having values (11, A, 312), and an entry based on input object ID 324 having values (11, B, 324). Three mapping table entries are generated for object subset 212C: a mapping table entry based on input object ID 316 having values (12, A, 316), an entry based on input object ID 326 having values (12, B, 326), and an entry based on input object ID 336 having values (12, C, 336). Two mapping table entries are generated for object subset 212D: a mapping table entry based on input object ID 318 having values (13, A, 318), and an entry based on input object ID 338 having values (13, C, 338).

The object state information 230 also includes a current object characteristics 234, which may include an entry for each input object received from cameras 202 for a current input frame or other suitable period of time. Each entry in the current object characteristics 234 may be, e.g., a row or record, and includes characteristics of an input object, such as an input object ID 416, an object shape 418, an object position 420, an object velocity 422, and an object acceleration 424. The input object ID 416 is an identifier that uniquely identifies the input object in the current object characteristics 234. The input object ID 416 may be a combination of the global object ID 410 and the camera ID 412, for example. The object shape 418 may be a 3D geometric shape of the object and may include a centroid, width, length, height, and/or orientation of the object. The object shape 418 may be a rectangular box the describes an object in world coordinates, for example. The position 420, velocity 422, and acceleration 424 may be a 3D position, velocity, and acceleration of the object, respectively.

As an example, tracking engine 124 generates an object state information entry for an input object identified by input object ID="10-A" and having shape, position, velocity, and acceleration shown as S1, P1, V1, and A1, respectively. The values S1, P1, V1, and A1 may be received from the perception pipeline 204A that provided the input object, for example. Tracking engine 124 can similarly generate other entries shown in current object characteristics 234 for respective entries in object mapping table 232 based on values received from perception pipelines 204.

Figure 4B:
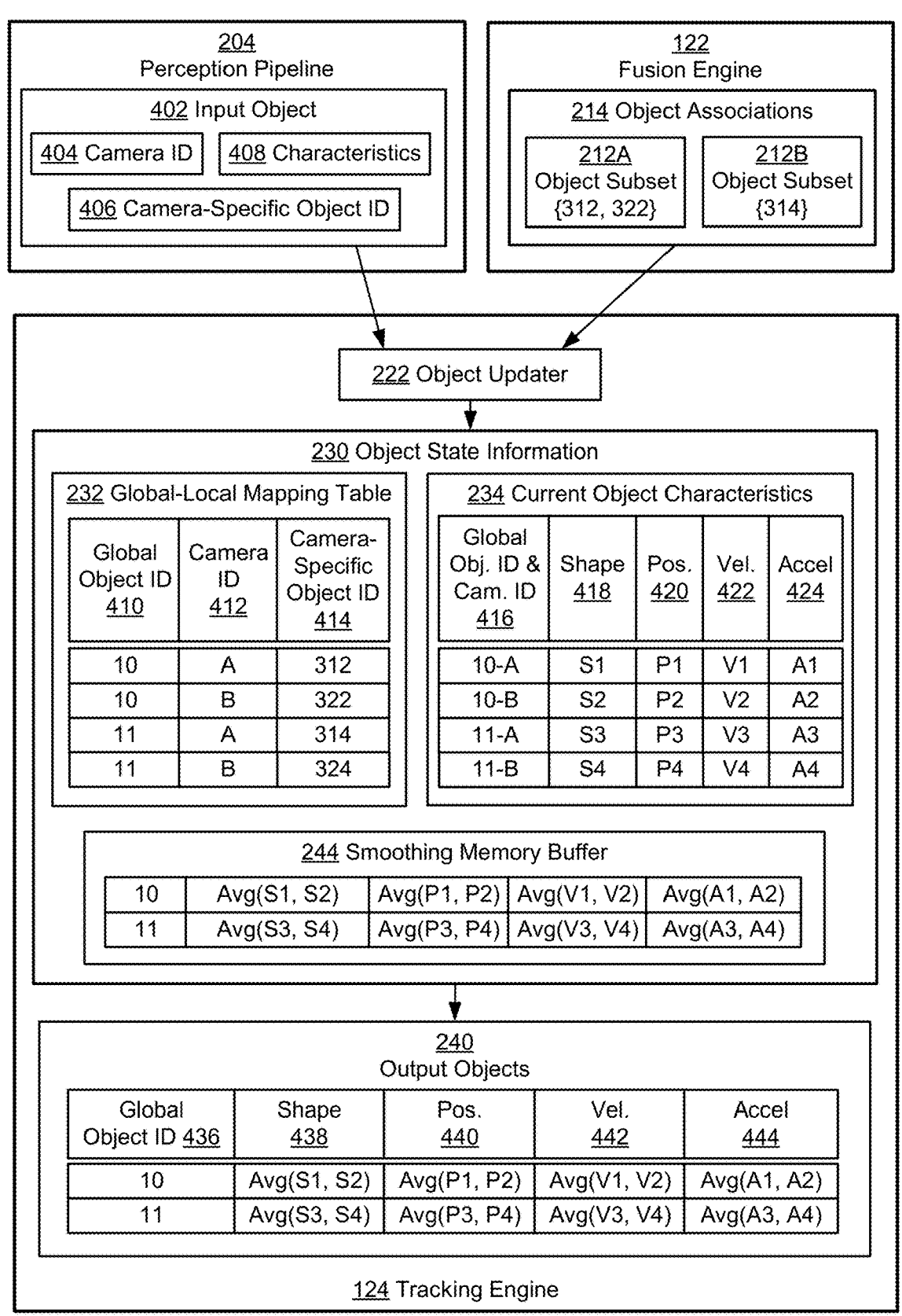
FIG. 4B illustrates example of output objects generated by a tracking engine based on object state information, according to various embodiments.

FIG. 4B illustrates example of output objects 240 generated by a tracking engine 124 based on object state information 230, according to various embodiments. Tracking engine 124 includes an object updater 222, which receives one or more input objects 402 from a perception pipeline 204. Each input object 402 may include or be associated with a camera ID 404, a camera-specific object ID 406, and/or one or more object characteristics 408. Object characteristics may include, for example, an object shape 418, an object position 420, an object velocity 422, and/or an object acceleration 424, as described herein with respect to the current object characteristics 234 of FIG. 4A. The object updater 222 may also receive one or more cross-camera object associations 214 from a fusion engine 122, and may generate object state information 230 based on the input object 402 and/or cross-camera object associations 214 as described herein with respect to FIG. 4A.

Tracking engine 124 generates one or more output objects 240 based on the object state information 230. For example, tracking engine 124 may generate an output object 240 for each distinct global object ID 410. Each output object 240 may include a global object ID 436 and/or object characteristics such as a shape 438, position 440, velocity 442, and/or acceleration 444. If a global object ID 410 is associated with a single input object, as may occur when a physical object is detected in a single camera, e.g., there is one entry having the global object ID 410 in the mapping table 232, then tracking engine 124 generates an output object 240 based on the characteristics of the single input object. A global object ID 410 may be associated with a single input object when the physical object is in the field of view of one camera, for example. The output object 240 may have one or more of the same characteristic values as the single input object.

If a global object ID 410 is associated with multiple input objects, then tracking engine 124 performs a smoothing operation that combines the characteristics of multiple input objects in smoothing memory buffer 244 to form an output object. A global object ID 410 may be associated with multiple input objects when the physical object is in the field of view of multiple cameras, for example. Tracking engine 124 may compute averages of the characteristics of multiple input objects in the smoothing memory buffer 244 and generate an output object having object characteristics based on those averages. In the examples shown in FIG. 4B, tracking engine 124 generates an output object 240 having global object ID=10 and object characteristics based on averages of two input objects 312, 322 that represent the same physical object 302.

The object characteristics of a first output object having global ID=10 are determined by calculating average characteristics of objects 312 and 322 as shown in smoothing memory buffer 244. A shape of the first output object is calculated as an average of shape S1 of object 312 and shape S2 of object 322. A position of the first output object is calculated as an average of position P1 of object 312 and position P2 of object 322. A velocity of the first output object is calculated as an average of velocity V1 of object 312 and velocity V2 of object 322. An acceleration of the first output object is calculated as an average of acceleration A1 of object 312 and acceleration A2 of object 322.

The object characteristics of a second output object having global ID=11 are determined similarly, by calculating average characteristics of objects 314 and 324. A shape of the second output object is calculated as an average of shape S3 of object 314 and shape S4 of object 324. A position of the second output object is calculated as an average of position P3 of object 314 and position P4 of object 324. A velocity of the second output object is calculated as an average of velocity V3 of object 314 and velocity V4 of object 324. An acceleration of the second output object is calculated as an average of acceleration A3 of object 314 and acceleration A4 of object 324. The values average values resulting from the calculations described herein are stored in the smoothing memory buffer 244 and copied to output objects 240. A first output object 240 having global object ID 10 has shape 438, position 440, velocity 442, and acceleration 444 calculated as averages of the respective object shape 418, object position 420, object velocity 422, and object acceleration 424 of the two input objects identified by input object IDs 416 having respective values 10-A and 10-B. Similarly, a second output object 240 having global object ID 11 has shape 438, position 440, velocity 442, and acceleration 444 calculated as averages of the respective object shape 418, position 420, velocity 422, and acceleration 424 of the two input objects identified by input object IDs 416 having respective values 11-A and 11-B.

FIG. 5 illustrates an example of sensor fusion using a graph-based cost optimization algorithm to identify object associations across multiple sensors, according to various embodiments. The cost optimization algorithm may be used by an object associator 210 to generate cross-camera object associations 214 based on input objects 206 as described herein with respect to FIG. 2. each input object subset represents a candidate association between objects captured by different cameras that potentially represent the same physical object. The cost optimization algorithm identifies a minimum cost set of cliques in the graph, and each clique in the minimum cost set of cliques contains a set of nodes corresponding to input objects that represent the same physical object.

The cost optimization algorithm generates the object associations 214 correctly and efficiently when there are two or more cameras. Other approaches to generating the object associations, such as bipartite matching, are limited to two cameras. The cost optimization algorithm constructs a graph 501 that represents a given set of input objects. The graph 501 includes a set of input nodes and a set of edges. Each edge connects two of the input nodes. The graph 501 may be implemented using a suitable a data structure. To construct the graph 501, the cost optimization algorithm creates an input node for each input object. The cost optimization algorithm also creates a node group 504 for each camera that can capture input objects. The node groups 504 are used subsequently in a determination of which input nodes to connect via edges. A node group 504 can be implemented as a set of input nodes using any suitable data structure. Each node group 504 includes the input nodes that correspond to a particular camera. To populate the node groups, for each input object. the cost optimization algorithm adds an input node to the node group 504 that corresponds to the camera that captured the input object represented by the input node. In this way, the input nodes are divided into groups that correspond to sensors.

For example, graph 501 includes a set of nodes divided into node groups 504. In this example, there are three sensors represented by three groups: Camera A Node Group 504A, Camera B Node Group 504B, and Camera C Node Group 504C. Two input objects are detected by camera A, so Camera A Node Group 504A includes two input nodes 511, 512. Three input objects are detected by camera B, so Camera B Node Group 504B includes three input nodes 513, 514, 515. One input object is detected by camera C, so Camera C Node Group 504C includes one input node 518.

The cost optimization algorithm identifies cliques in the graph, where each clique is a subgraph that contains one node from each group, and each pair of nodes in the subgraph is connected by an edge. Thus, each of the nodes in the clique is in a different group, and is connected to each of the other nodes in the clique. Each clique represents an object association, e.g., a subset of input nodes representing input objects that potentially represent the same physical object. To identify cliques in which all nodes correspond to the same physical object, the cost optimization algorithm identifies a set of cliques in a graph 501, computes a cost of each clique based on edge costs, computes a sum of the costs of each identified clique in a graph 501, and identifies a minimum cost set of cliques in which the sum of the costs of the cliques is less than the sums of the costs of other identified sets of cliques, as described herein. However, if one or more of the groups has more nodes than another group, e.g., as in node groups 504A and 504B of graph 501, then calculating costs of cliques is problematic. For example, the costs of cliques having different numbers of edges are not comparable. The cost of a clique having three edges is not comparable to the cost of a clique having two edges. Thus, the cost association algorithm adds additional nodes, referred to herein as "dummy nodes," to groups in the graph 501.

In some embodiments, the cost association algorithm adds one dummy node to each group 504. In other embodiments, the cost association algorithm adds dummy nodes to groups 504 having fewer nodes than other groups 504, so that each group 504 has the same number of nodes. Prior to adding any dummy nodes, the cost association algorithm may identify a group having a maximum number of nodes compared to other groups. The cost association algorithm may use the maximum value to determine how many dummy nodes to add to each of the other groups having fewer than the maximum number of input nodes. The number of dummy nodes to add to a group may be determined as the maximum minus the number of input nodes in the group. The cost optimization algorithm then augments each node group 504 with a sufficient number of dummy nodes so that each input node in each group 504 can be connected to a node in each of the other groups.

In the example shown in FIG. 5, the cost optimization algorithm generates a graph 502 by adding a dummy node 516 to node group 504A, a dummy node 517 to node group 504B, and a dummy node 519 to node group 504C. The cost optimization algorithm then generates one or more three-node cliques, each of which includes one node from each node group 504 and an edge between each pair of nodes in the clique. Three three-node example cliques are shown in graph 503. A first clique that includes input node 511, input node 513, and input node 518 has edges shown as solid lines. A second clique that includes input node 512, input node 514, and dummy node 519 has edges shown as dashed lines with short dashes. A third clique that includes dummy node 516, input node 515, and dummy node 519 has edges shown as dashed lines with long dashes. The cost optimization algorithm can generate other cliques in addition to those shown in the graph 503. For example, a clique may be generated for each combination of three nodes from three different node groups 504. In other examples, fewer or more than three cameras may provide input images, in which case the number of node groups 504, and the number of nodes in each clique (one node form each group) would correspond to the number of cameras.

The cost optimization algorithm calculates a cost of each clique as a sum of the costs of the edges in the clique. For example, the cost of the clique that has solid edge lines and contains input nodes 511, 513, and 518 is calculated as the sum of the cost of the edge between nodes 511 and 513, the cost of the edge between nodes 513 and 518, and the cost of the edge between node 511 and 518.

Figure 6A:
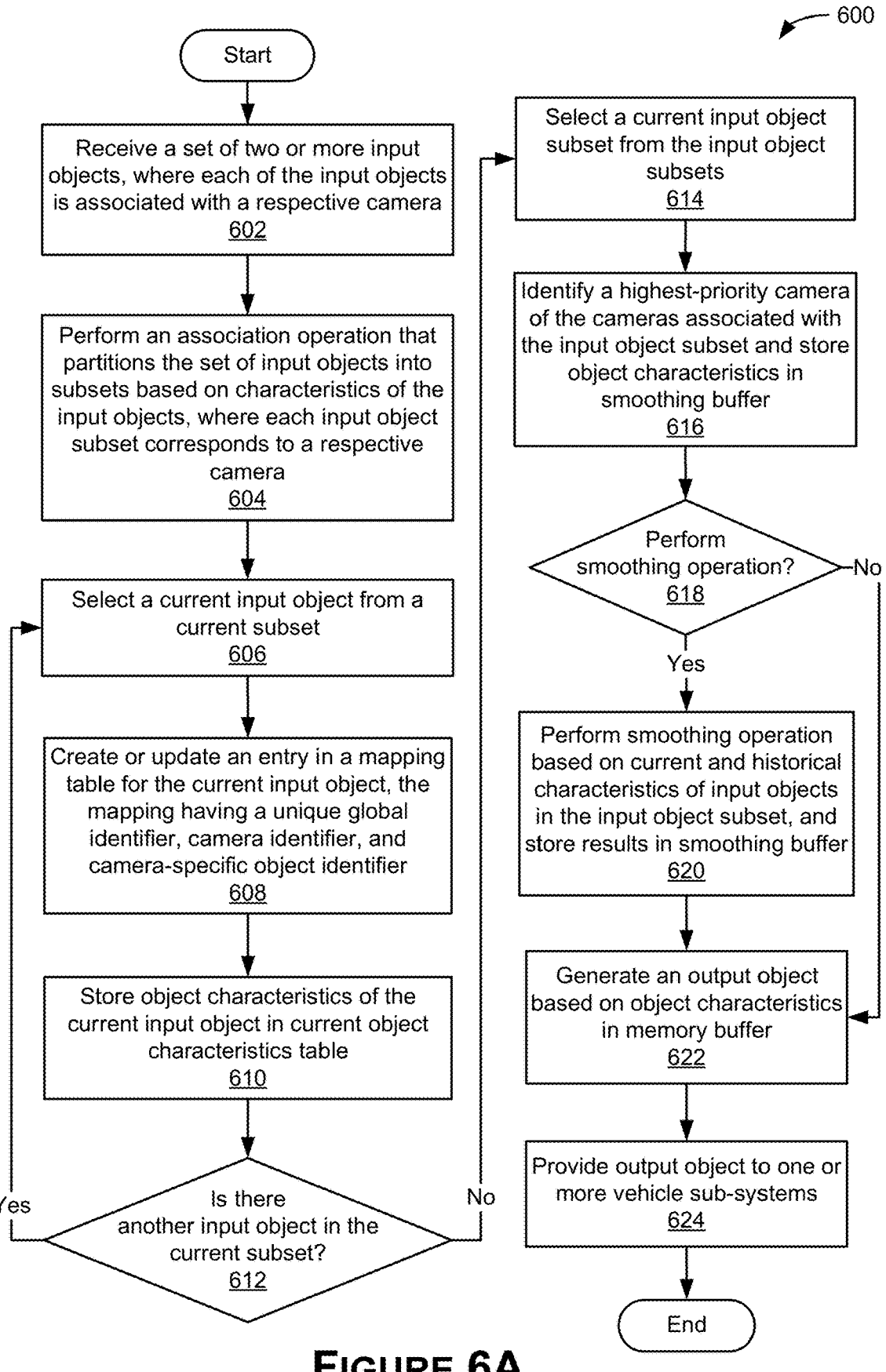
FIG. 6A illustrates a flow diagram of a method for fusion and/or tracking of objects detected by multiple cameras, according to various embodiments.

Now referring to FIG. 6A, each block of method 600, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 600 is described, by way of example, with respect to the system of FIGS. 1-2. However, this method may additionally or alternatively be executed by any one system, or any combination of systems, including, but not limited to, those described herein. Further, the operations in method 600 can be omitted, repeated, and/or performed in any order without departing from the scope of the present disclosure.

FIG. 6A illustrates a flow diagram of a method for fusion and/or tracking of objects detected by multiple cameras, according to various embodiments. As shown in FIG. 6A, method 600 begins with operation 602, in which fusion engine 122 receives a set, where each of the input objects is associated with a respective camera. The set of input objects may include two or more input objects. For example, the two or more input objects may include a first input object captured by a first camera. The first input object may be associated with a first set of object characteristics. The two or more input objects may also include a second input object captured by a second camera and associated with a second set of object characteristics, such that the first input object and the second input object depict the physical object.

In operation 604, fusion engine 122 performs an association operation that partitions the set of input objects into a plurality of subsets based on characteristics of the input objects. Thus, the association operation identifies a plurality of subsets of the set of input objects. Each identified subset includes one or more identified input objects included in the plurality of input objects. The association operation may be a graph-based cost optimization algorithm such as that shown in FIG. 5, for example. The plurality of subsets of the plurality of input objects may be identified using the cost optimization algorithm. Each subset includes one or more identified input objects included in the plurality of input objects, wherein the one or more identified input objects satisfy a similarity criterion. The cost optimization algorithm may use a similarity criterion specifying that a total cost determined for the input objects in a subset is minimized. Thus, the cost optimization algorithm minimizes the total cost, wherein the total cost is based on a plurality of costs. The plurality of costs may include a cost determined for each pair of input objects that are based on images generated by different cameras.

The cost optimization algorithm may be performed on a graph of comprising nodes and vertices. Each camera may correspond to a subset of the nodes, each node may correspond to an input object, and each vertex may be associated with the cost between a pair of input objects that are in different subsets of the nodes. At least one dummy node may be included in each subset of the nodes, and a vertex between a dummy node and a second node is associated with a default cost.

In operation 606, tracking engine 124 selects an input object subset, referred to herein as a current subset, and selects one of the input objects from the selected input object subset, referred to herein as a current input object. Tracking engine 124 may repeat operation 606 and subsequent operations for each subset of input objects. For each subset of input objects, tracking engine 124 may repeat operation 606 and subsequent operations for each input object in the subset, as described herein.

In operation 608, tracking engine 124 determines whether an entry exists in a mapping table 232 for the current input object. An entry for an input object exists in the mapping table if the mapping table contains an entry having the same camera ID 412 and camera-specific object ID 414 as the input object. If an entry does not exist, tracking engine 124 creates an entry in the mapping table for the current input object. The entry includes a global object identifier associated with the selected subset, the camera identifier of the current input object, and the camera-specific object identifier of the current input object. Tracking engine 124 uses the same global object for each input object in the current subset, since each input object in the current subset represents the same physical object (from a different camera viewpoint). If an entry for the current object does not exist in the mapping table, tracking engine 124 generates a new global object identifier and stores the new global identifier in the entry created in the mapping table. Perception pipelines 204 do not re-use camera-specific object IDs for different objects, so if a combination of a camera ID and camera-specific object ID does not exist in the mapping table, the input object has not previously been seen, and can be assigned a new global object ID.

If tracking engine 124 determines that an entry for the current input object exists in the mapping table, tracking engine 124 updates the existing entry in the mapping table, e.g., by storing the camera identifier of the current input object and the camera-specific object identifier of the current input object in the existing entry. If the entry for the current object exists, tracking engine 124 reuses the global object identifier of the existing entry.

Tracking engine 124 then performs operation 610, in which tracking engine 124 stores object characteristics of the current input object in current object characteristics 234. If tracking engine 124 determined that an entry for the current input object exists in the mapping table, then tracking engine 124 copies or moves object characteristics associated with the current input object from current object characteristics 234 to historical object characteristics 236 prior to storing the object characteristics of the current input object in current object characteristics 234. For example, to copy or move the object characteristics, tracking engine 124 may copy or move an entry from object characteristics having the same combination of camera ID and camera-specific object ID, or the same combination of global object ID and camera ID, as the current input object to historical object characteristics 236. Each entry in historical object characteristics 236 may include a frame number and/or time stamp that distinguishes the entry from other entries and can be used to identify the age of the entry.

In operation 612, tracking engine 124 determines whether there is another input object in the current subset, or, if not, whether there is another subset, in which case tracking engine 124 advances the current subset to the next subset. If there is another input object in the current subset, or if not, if there is another subset, then tracking engine 124 performs operation 606 again. Thus, tracking engine 124 repeats operations 606-612 for each input object in each input object subset identified by the association operation performed in operation 604. As a result, an entry is created in the object mapping table 232 for each input object in each subset. Each of the entries for a subset represents the same physical object as seen from a different camera. Entries for different subsets represent different physical objects. Further, as a result of executing operation 610 for each input object in each input object subset, the current object characteristics 234 include object characteristics for each of the input objects 206 from each camera 202, and/or object characteristics for input objects from previous frames (if any) have been moved or copied to historical object characteristics 236.

In operation 614, tracking engine 124 begins an iteration over the input object subsets by selecting a current input object subset from the input object subsets. As described herein, the input object subsets are identified by the association operation at operation 604.

In operation 616, tracking engine 124 identifies a highest-priority camera of the cameras associated with the input object subset and stores object characteristics in a memory buffer 244. As described herein, the highest-priority camera is a camera having a priority greater than or equal to a priority of each of one or more other cameras associated with other input objects in the input object subset. The tracking engine 124 stores the object characteristics, such as a position, velocity, orientation, and/or acceleration of the object, in the memory buffer. The memory buffer may be a portion of memory, for example.

In operation 618, the tracking engine determines whether to perform a smoothing operation on the current input object subset. Tracking engine 124 may perform the smoothing operation if, for example, the priority of the highest priority camera is not substantially greater than the priority of any other camera associated with an input object in the subset 212, and/or the physical object that corresponds to the identified input object 206 is visible in multiple cameras 202. As described herein with respect to FIG. 2, if the priority of the highest priority camera is substantially greater than the priority of any other camera associated with an input object in the subset 212, then tracking engine 124 may generate an output object having the object characteristics of the input object associated with the highest-priority camera without performing the smoothing operation. Further, as described herein with reference to FIG. 2, the physical object is visible in multiple cameras if, for example, the current input object subset 212 that contains the identified input object 206 also contains one or more other input objects 206. As another example, the physical object is visible in multiple cameras if there is at least one other entry in the object mapping table 232 having the same global object ID as the identified input object.

If at operation 618 tracking engine 124 determines that the smoothing operation is to be performed, then tracking engine 124 performs operation 620, in which tracking engine 124 performs a smoothing operation based on the identified input object and other input objects in the current input object subset (if any), and stores the result of the smoothing operation in a memory buffer 244. For example, tracking engine 124 may perform the smoothing operation by performing the operations of method 6160 shown in of FIG. 6B. Tracking engine 124 then performs operation 620, as described herein. Otherwise, if at operation 618 tracking engine 124 determines that the smoothing operation is not to be performed, then tracking engine 124 performs operation 622 without performing the smoothing operation.

In operation 622, tracking engine 124 generates an output object 240 based on contents of the memory buffer 244. For example, tracking engine 124 may copy the contents of the memory buffer 244, including a global object ID and values of the characteristics, to an output object 240 having a global object ID 436, shape 438, position 440, velocity 442, and/or acceleration 444, as shown in FIG. 4B. The values copied from the memory buffer 244 to the output objects 240 may be averages of characteristics of multiple input objects if smoothing was performed. Alternatively, the values copied from the memory buffer 244 to the output objects 240 may be the characteristics from a single input object (stored in the memory buffer in operation 616) if smoothing was not performed.

In operation 624, tracking engine 124 provides the output object to one or more vehicle sub-systems, such as a planning sub-system. Fusion engine 122 and/or tracking engine 124 also repeat operations 614-624 for each of the input object subset identified by the association operation in operation 604.

Figure 6B:
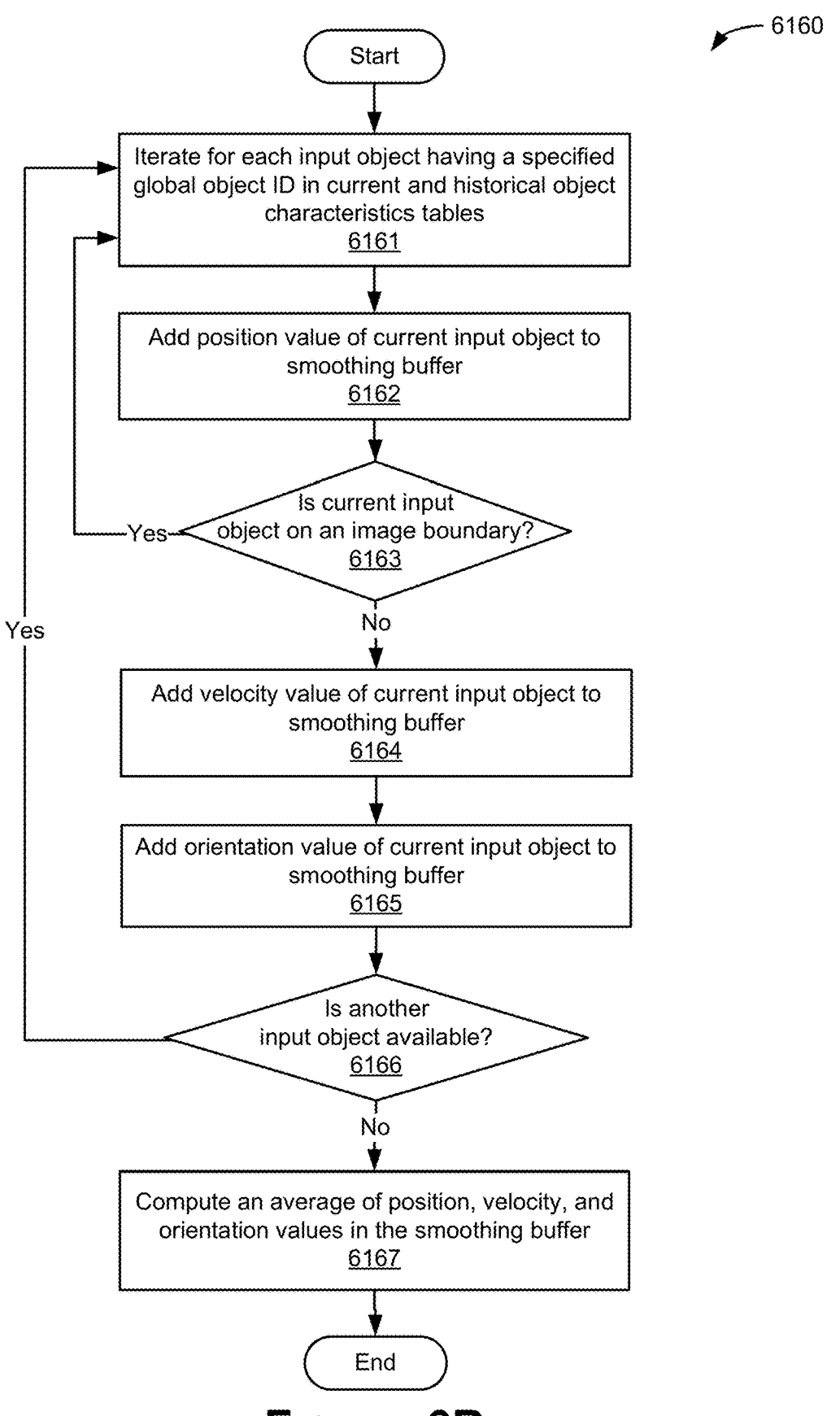
FIG. 6B illustrates a flow diagram of a method for performing smoothing operations for a tracked object, according to various embodiments.

Now referring to FIG. 6B, each block of method 6160, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 6160 is described, by way of example, with respect to the system of FIGS. 1-2. However, this method may additionally or alternatively be executed by any one system, or any combination of systems, including, but not limited to, those described herein. Further, the operations in method 6160 can be omitted, repeated, and/or performed in any order without departing from the scope of the present disclosure.

FIG. 6B illustrates a flow diagram of a method for performing smoothing operations for a tracked object, according to various embodiments. The smoothing operations determine an average of the values of one or more fields over a history of input objects that represent a physical object. The input objects may have a specified global object ID that identifies a physical object. The history of input objects may include the current object characteristics 234 and/or the historical object characteristics 236. In the calculation of averages, weighting may be applied to some object characteristics such as position, the estimate of which can be error prone because of occlusion by other objects or at image boundaries. In one example, the smoothing operations may calculate the distance from the image boundary for an input object and use lower weights for the characteristics of input objects that are near the image border. For objects that are at (e.g., overlapping or adjacent to) the image border, the orientation and/or velocity characteristics may be excluded, since the orientation and/or velocity characteristics may introduce a significant amount of error in the smoothing.

As shown in FIG. 6B, method 6160 begins with operation 6161. In operation 6161, tracking engine 124 iterates over one or more input objects in a history of input objects that have a specified global object ID. The history may include the current frame (for which values are available in current object characteristics 234) and a specified number of previous frames (for which values are available in historical object characteristics 236), e.g., between 5 and 10 frames captured prior to a current frame. As an example, for two input objects, such as input objects having ID values 10-A and 11-A from current object characteristics 234, which represent the same physical object, iterating over the last 5 frames may identify approximately 50 data points from the history of input objects. If fewer than a threshold number of previous frames are available, then method 6160 may iterate over input objects in the current frame but not over input objects in previous frames. The threshold number may be a suitable number of frames that provide an acceptable level of accuracy, e.g., 5, 10, 15, or other suitable number of frames.

By iterating through the history of input objects that have a specified global object ID representing a physical object, the tracking engine 124 may identify previous frames for a physical object that is not depicted in the current frame because the physical object has recently disappeared from view. If a physical object passes across the views of multiple cameras, the global object ID associated with the physical object is preserved as unique because the global object ID is maintained in the mapping table 232. The physical object may disappear from and reappear in view from time to time, and accessing recent frames in the history may improve object tracking accuracy because of the increased number of data points from different cameras. Accessing recent frames is useful in cases where objects such as other vehicles are passing by the vehicle and move between fields of view of different cameras, such as from rear to side to front cameras.

Tracking engine 124 may retrieve one or more input objects from the history of input objects for previous frames by retrieving entries having a specified global object ID from the current object characteristics 234 (e.g., the current frame) and/or historical object characteristics 236 (e.g., previous frames). Each entry represents an input object. For example, tracking engine 124 may select an entry (e.g., row) from a current object characteristics 234 or historical object characteristics 236 having the specified global object ID and retrieve characteristic values such as a position value, velocity value, and/or orientation value from the selected entry. The selected entry for which values are retrieved in a particular iteration is referred to herein as a current entry, and the input object that corresponds to the current entry is referred to herein as a current input object. The current entry in the object characteristics 234 or 236 represents a data point to be used in the smoothing operation.

In operation 6162, tracking engine 124 adds the retrieved position value of the current input object to a smoothing memory buffer 244. The memory buffer 244 may be a portion of memory, for example. Tracking engine 124 may add the retrieved position value to an accumulated total value stored in the memory buffer. For example, adding the position to the buffer may cause the position to be included in the average calculation performed in operation 6167. The memory buffer may include a memory area in which an average position is stored, a memory area in which an average velocity is stored, and/or a memory area in which an average orientation is stored. That is, the memory buffer may include a position smoothing memory buffer, a velocity smoothing memory buffer, and/or an orientation smoothing memory buffer.

In operation 6163, tracking engine 124 determines whether the current input object is on an object boundary. For example, tracking engine 124 may determine whether the coordinates of the current input object in an input image are on, adjacent to, or near (e.g., within a threshold number of pixels of) a border of the input image. If the current input object is on an image boundary, tracking engine 124 bypasses the addition of velocity and/or orientation values to the memory buffer at operations 6164 and 6165, and performs operation 6161, in which tracking engine 124 continues iterating over the history of input objects, e.g., by selecting another entry in the object entry information having the specified global object ID, without adding the velocity or orientation to the memory buffer. If the current input object is not on an image boundary, tracking engine 124 performs operation 6164 and subsequent operations, as described herein.

Weighting may be applied to some object characteristics, such as position, for which the estimate can be error prone because of occlusion by another object or occlusion at image boundaries. A distance of the current input object from the image boundary may be computed, and a weight may be determined based on the distance such that smaller weights are used for measurements of data points that are near the image border. For objects that are at the image border, measurements for orientation and/or velocity may be excluded from the smoothing calculation, since orientation and/or velocity values for input objects near the border may introduce a significant amount of error into the smoothing.

In operation 6164, tracking engine 124 adds the velocity value of the current input object to the memory buffer. For example, adding the velocity to the buffer may cause the velocity to be included in the average calculation performed in operation 6167. In operation 6165, tracking engine 124 adds the orientation value of the current input object to the memory buffer. Adding the orientation value to the buffer may cause the orientation to be included in the average calculation performed in operation 6167.

In operation 6166, tracking engine 124 determines whether another input object having the specified global object ID is available in the object state information 230. If another input object is available, tracking engine 124 performs operation 6161 and subsequent operations again. Tracking engine 124 repeats operations 6161-6166 while more input objects having the specified global object ID are available in the object state information 230. another input object not available, tracking engine 124 performs operation 6167, in which tracking engine 124 computes an average of the position, velocity, and/or orientation values that have been added to the memory buffer.

Example Autonomous Vehicle

Figure 7A:
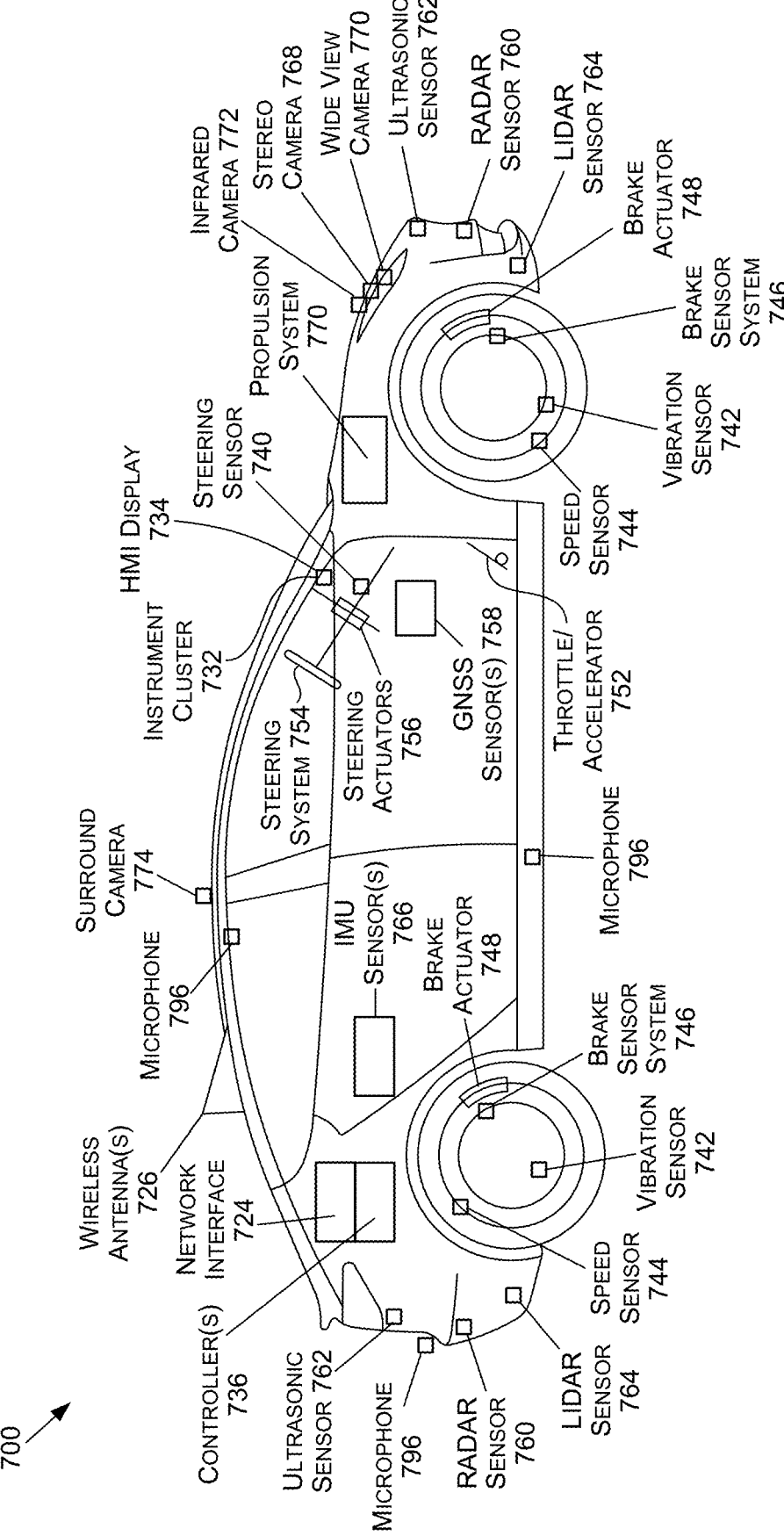
FIG. 7A is an illustration of an example autonomous vehicle, in accordance with some embodiments of the present disclosure.

FIG. 7A is an illustration of an example autonomous vehicle 700, in accordance with some embodiments of the present disclosure. The autonomous vehicle 700 (alternatively referred to herein as the "vehicle 700") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 700 may be capable of functionality in accordance with one or more of Level 3-Level 7 of the autonomous driving levels. The vehicle 700 may be capable of functionality in accordance with one or more of Level 1-Level 7 of the autonomous driving levels. For example, the vehicle 700 may be capable of driver assistance (Level 1), partial automation (Level 2), conditional automation (Level 3), high automation (Level 4), and/or full automation (Level 7), depending on the embodiment. The term "autonomous," as used herein, may include any and/or all types of autonomy for the vehicle 700 or other machine, such as being fully autonomous, being highly autonomous, being conditionally autonomous, being partially autonomous, providing assistive autonomy, being semi-autonomous, being primarily autonomous, or other designation.

The vehicle 700 may include components such as a chassis, a vehicle body, wheels (e.g., 2, 4, 6, 8, 18, etc.), tires, axles, and other components of a vehicle. The vehicle 700 may include a propulsion system 750, such as an internal combustion engine, hybrid electric power plant, an all-electric engine, and/or another propulsion system type. The propulsion system 750 may be connected to a drive train of the vehicle 700, which may include a transmission, to enable the propulsion of the vehicle 700. The propulsion system 750 may be controlled in response to receiving signals from the throttle/accelerator 752.

A steering system 754, which may include a steering wheel, may be used to steer the vehicle 700 (e.g., along a desired path or route) when the propulsion system 750 is operating (e.g., when the vehicle is in motion). The steering system 754 may receive signals from a steering actuator 756. The steering wheel may be optional for full automation (Level 7) functionality.

The brake sensor system 746 may be used to operate the vehicle brakes in response to receiving signals from the brake actuators 748 and/or brake sensors.

Controller(s) 736, which may include one or more system on chips (SoCs) 704 (FIG. 7C) and/or GPU(s), may provide signals (e.g., representative of commands) to one or more components and/or systems of the vehicle 700. For example, the controller(s) may send signals to operate the vehicle brakes via one or more brake actuators 748, to operate the steering system 754 via one or more steering actuators 756, to operate the propulsion system 750 via one or more throttle/accelerators 752. The controller(s) 736 may include one or more onboard (e.g., integrated) computing devices (e.g., supercomputers) that process sensor signals, and output operation commands (e.g., signals representing commands) to enable autonomous driving and/or to assist a human driver in driving the vehicle 700. The controller(s) 736 may include a first controller 736 for autonomous driving functions, a second controller 736 for functional safety functions, a third controller 736 for artificial intelligence functionality (e.g., computer vision), a fourth controller 736 for infotainment functionality, a fifth controller 736 for redundancy in emergency conditions, and/or other controllers. In some examples, a single controller 736 may handle two or more of the above functionalities, two or more controllers 736 may handle a single functionality, and/or any combination thereof.

The controller(s) 736 may provide the signals for controlling one or more components and/or systems of the vehicle 700 in response to sensor data received from one or more sensors (e.g., sensor inputs). The sensor data may be received from, for example and without limitation, global navigation satellite systems ("GNSS") sensor(s) 758 (e.g., Global Positioning System sensor(s)), RADAR sensor(s) 760, ultrasonic sensor(s) 762, LiDAR sensor(s) 764, inertial measurement unit (IMU) sensor(s) 766 (e.g., accelerometer(s), gyroscope(s), magnetic compass(es), magnetometer(s), etc.), microphone(s) 796, stereo camera(s) 768, wide-view camera(s) 770 (e.g., fisheye cameras), infrared camera(s) 772, surround camera(s) 774 (e.g., 360 degree cameras), long-range and/or mid-range camera(s) 798, speed sensor(s) 744 (e.g., for measuring the speed of the vehicle 700), vibration sensor(s) 742, steering sensor(s) 740, brake sensor(s) (e.g., as part of the brake sensor system 746), and/or other sensor types. The controller(s) 736 may include one or more instances of fusion engine 122 and/or tracking engine 124 to monitor sensor performance based on the corresponding sensor data.

One or more of the controller(s) 736 may receive inputs (e.g., represented by input data) from an instrument cluster 732 of the vehicle 700 and provide outputs (e.g., represented by output data, display data, etc.) via a human-machine interface (HMI) display 734, an audible annunciator, a loudspeaker, and/or via other components of the vehicle 700. The outputs may include information such as vehicle velocity, speed, time, map data (e.g., the High Definition ("HD") map 722 of FIG. 7C), location data (e.g., the vehicle's 700 location, such as on a map), direction, location of other vehicles (e.g., an occupancy grid), information about objects and status of objects as perceived by the controller(s) 736, etc. For example, the HMI display 734 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 700 further includes a network interface 724 which may use one or more wireless antenna(s) 726 and/or modem(s) to communicate over one or more networks. For example, the network interface 724 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. The wireless antenna(s) 726 may also enable communication between objects in the environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Figure 7B:
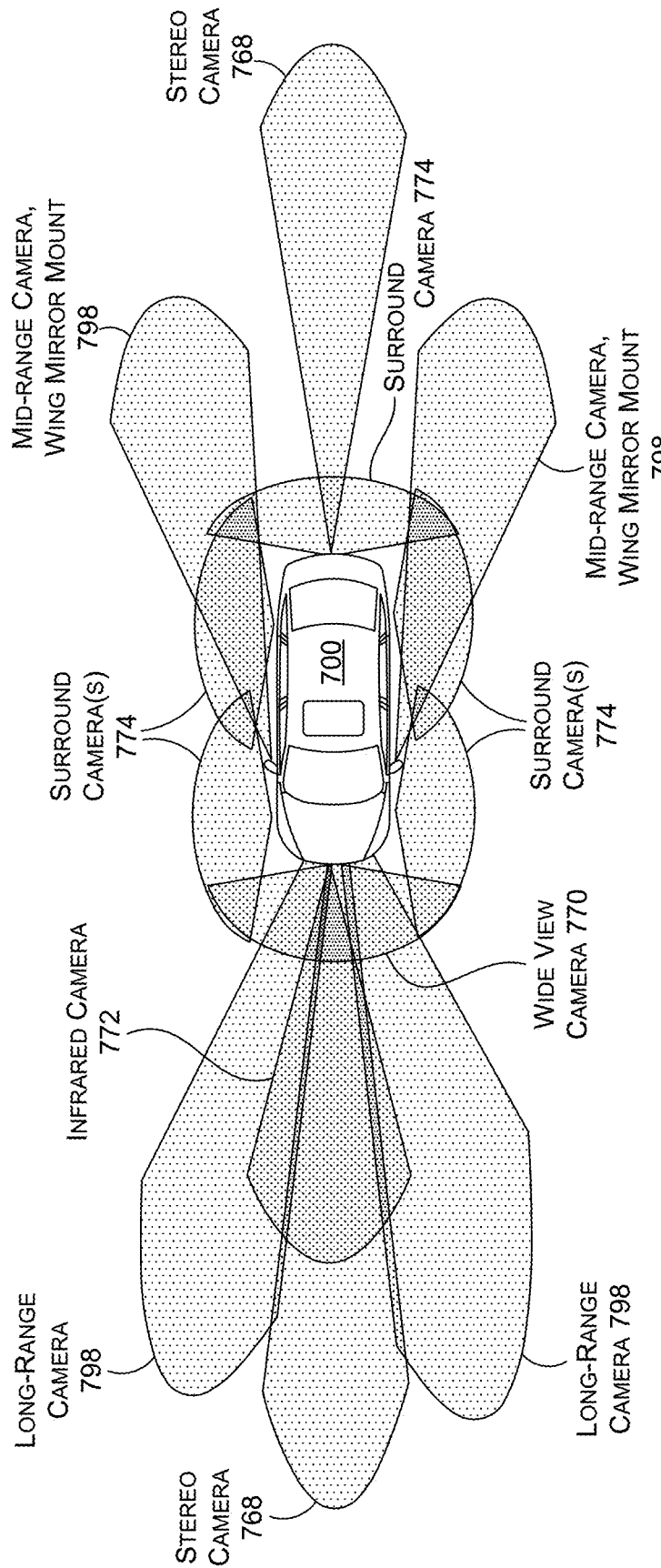
FIG. 7B is an example of camera locations and fields of view for the example autonomous vehicle of FIG. 7A, in accordance with some embodiments of the present disclosure.

FIG. 7B is an example of camera locations and fields of view for the example autonomous vehicle 700 of FIG. 7A, in accordance with some embodiments of the present disclosure. The cameras and respective fields of view are one example embodiment and are not intended to be limiting. For example, additional and/or alternative cameras may be included and/or the cameras may be located at different locations on the vehicle 700.

The camera types for the cameras may include, but are not limited to, digital cameras that may be adapted for use with the components and/or systems of the vehicle 700. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (three dimensional ("3D") printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 700 (e.g., front-facing cameras) may be used for surround view, to help identify forward facing paths and obstacles, as well aid in, with the help of one or more controllers 736 and/or control SoCs, providing information critical to generating an occupancy grid and/or determining the preferred vehicle paths. Front-facing cameras may be used to perform many of the same ADAS functions as LiDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a complementary metal oxide semiconductor ("CMOS") color imager. Another example may be a wide-view camera(s) 770 that may be used to perceive objects coming into view from the periphery (e.g., pedestrians, crossing traffic or bicycles). Although only one wide-view camera is illustrated in FIG. 7B, there may be any number (including zero) of wide-view cameras 770 on the vehicle 700. In addition, any number of long-range camera(s) 798 (e.g., a long-view stereo camera pair) may be used for depth-based object detection, especially for objects for which a neural network has not yet been trained. The long-range camera(s) 798 may also be used for object detection and classification, as well as basic object tracking.

Any number of stereo cameras 768 may also be included in a front-facing configuration. In at least one embodiment, one or more of stereo camera(s) 768 may include an integrated control unit comprising a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 768 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 768 may be used in addition to, or alternatively from, those described herein.

Cameras with a field of view that include portions of the environment to the side of the vehicle 700 (e.g., side-view cameras) may be used for surround view, providing information used to create and update the occupancy grid, as well as to generate side impact collision warnings. For example, surround camera(s) 774 (e.g., four surround cameras 774 as illustrated in FIG. 7B) may be positioned to on the vehicle 700. The surround camera(s) 774 may include wide-view camera(s) 770, fisheye camera(s), 360 degree camera(s), and/or the like. Four example, four fisheye cameras may be positioned on the vehicle's front, rear, and sides. In an alternative arrangement, the vehicle may use three surround camera(s) 774 (e.g., left, right, and rear), and may leverage one or more other camera(s) (e.g., a forward-facing camera) as a fourth surround view camera.

Cameras with a field of view that include portions of the environment to the rear of the vehicle 700 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 798, stereo camera(s) 768), infrared camera(s) 772, etc.), as described herein.

Figure 7C:
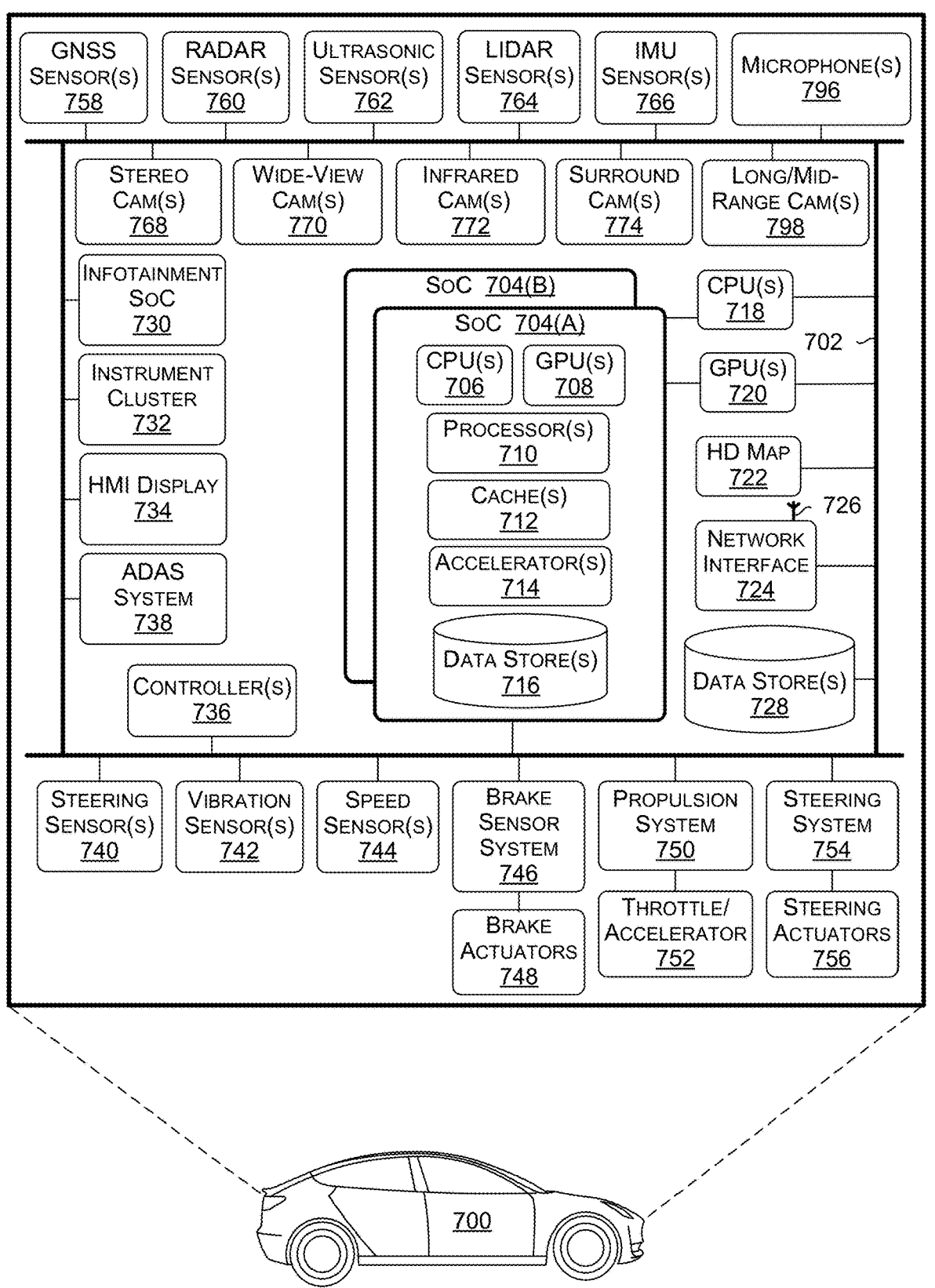
FIG. 7C is a block diagram of an example system architecture for the example autonomous vehicle of FIG. 7A, in accordance with some embodiments of the present disclosure.

FIG. 7C is a block diagram of an example system architecture for the example autonomous vehicle 700 of FIG. 7A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 700 in FIG. 7C are illustrated as being connected via bus 702. The bus 702 may include a Controller Area Network (CAN) data interface (alternatively referred to herein as a "CAN bus"). A CAN may be a network inside the vehicle 700 used to aid in control of various features and functionality of the vehicle 700, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 702 is described herein as being a CAN bus, this is not intended to be limiting. For example, in addition to, or alternatively from, the CAN bus, FlexRay and/or Ethernet may be used. Additionally, although a single line is used to represent the bus 702, this is not intended to be limiting. For example, there may be any number of busses 702, which may include one or more CAN busses, one or more FlexRay busses, one or more Ethernet busses, and/or one or more other types of busses using a different protocol. In some examples, two or more busses 702 may be used to perform different functions, and/or may be used for redundancy. For example, a first bus 702 may be used for collision avoidance functionality and a second bus 702 may be used for actuation control. In any example, each bus 702 may communicate with any of the components of the vehicle 700, and two or more busses 702 may communicate with the same components. In some examples, each SoC 704, each controller 736, and/or each computer within the vehicle may have access to the same input data (e.g., inputs from sensors of the vehicle 700), and may be connected to a common bus, such the CAN bus.

The vehicle 700 may include one or more controller(s) 736, such as those described herein with respect to FIG. 7A. The controller(s) 736 may be used for a variety of functions. The controller(s) 736 may be coupled to any of the various other components and systems of the vehicle 700, and may be used for control of the vehicle 700, artificial intelligence of the vehicle 700, infotainment for the vehicle 700, and/or the like.

The vehicle 700 may include a system(s) on a chip (SoC) 704. The SoC 704 may include CPU(s) 706, GPU(s) 708, processor(s) 710, cache(s) 712, accelerator(s) 714, data store(s) 716, and/or other components and features not illustrated. The SoC(s) 704 may be used to control the vehicle 700 in a variety of platforms and systems. For example, the SoC(s) 704 may be combined in a system (e.g., the system of the vehicle 700) with an HD map 722 which may obtain map refreshes and/or updates via a network interface 724 from one or more servers (e.g., server(s) 778 of FIG. 7D).

The CPU(s) 706 may include a CPU cluster or CPU complex (alternatively referred to herein as a "CCPLEX"). The CPU(s) 706 may include multiple cores and/or L2 caches. For example, in some embodiments, the CPU(s) 706 may include eight cores in a coherent multi-processor configuration. In some embodiments, the CPU(s) 706 may include four dual-core clusters where each cluster has a dedicated L2 cache (e.g., a 2 MB L2 cache). The CPU(s) 706 (e.g., the CCPLEX) may be configured to support simultaneous cluster operation enabling any combination of the clusters of the CPU(s) 706 to be active at any given time.

The CPU(s) 706 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 706 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 708 may include an integrated GPU (alternatively referred to herein as an "iGPU"). The GPU(s) 708 may be programmable and may be efficient for parallel workloads. The GPU(s) 708, in some examples, may use an enhanced tensor instruction set. The GPU(s) 708 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 712 KB storage capacity). In some embodiments, the GPU(s) 708 may include at least eight streaming microprocessors. The GPU(s) 708 may use compute application programming interface(s) (API(s)). In addition, the GPU(s) 708 may use one or more parallel computing platforms and/or programming models (e.g., NVIDIA's CUDA).

The GPU(s) 708 may be power-optimized for best performance in automotive and embedded use cases. For example, the GPU(s) 708 may be fabricated on a Fin field-effect transistor (FinFET). However, this is not intended to be limiting and the GPU(s) 708 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 708 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 708 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 708 to access the CPU(s) 706 page tables directly. In such examples, when the GPU(s) 708 memory management unit (MMU) experiences a miss, an address translation request may be transmitted to the CPU(s) 706. In response, the CPU(s) 706 may look in its page tables for the virtual-to-physical mapping for the address and transmits the translation back to the GPU(s) 708. As such, unified memory technology may allow a single unified virtual address space for memory of both the CPU(s) 706 and the GPU(s) 708, thereby simplifying the GPU(s) 708 programming and porting of applications to the GPU(s) 708.

In addition, the GPU(s) 708 may include an access counter that may keep track of the frequency of access of the GPU(s) 708 to memory of other processors. The access counter may help ensure that memory pages are moved to the physical memory of the processor that is accessing the pages most frequently.

The SoC(s) 704 may include any number of cache(s) 712, including those described herein. For example, the cache(s) 712 may include an L3 cache that is available to both the CPU(s) 706 and the GPU(s) 708 (e.g., that is connected both the CPU(s) 706 and the GPU(s) 708). The cache(s) 712 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 704 may include an arithmetic logic unit(s) (ALU(s)) which may be leveraged in performing processing with respect to any of the variety of tasks or operations of the vehicle 700—such as processing DNNs. In addition, the SoC(s) 704 may include a floating point unit(s) (FPU(s))— or other math coprocessor or numeric coprocessor types—for performing mathematical operations within the system. For example, the SoC(s) 704 may include one or more FPUs integrated as execution units within a CPU(s) 706 and/or GPU(s) 708.

The SoC(s) 704 may include one or more accelerators 714 (e.g., hardware accelerators, software accelerators, or a combination thereof). For example, the SoC(s) 704 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 708 and to off-load some of the tasks of the GPU(s) 708 (e.g., to free up more cycles of the GPU(s) 708 for performing other tasks). As an example, the accelerator(s) 714 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 714 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 708, and by using an inference accelerator, for example, a designer may target either the DLA(s) or the GPU(s) 708 for any function. For example, the designer may focus processing of CNNs and floating point operations on the DLA(s) and leave other functions to the GPU(s) 708 and/or other accelerator(s) 714.

The accelerator(s) 714 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 706. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 714 (e.g., the hardware acceleration cluster) may include a computer vision network on-chip and SRAM, for providing a high-bandwidth, low latency SRAM for the accelerator(s) 714. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 704 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LiDAR data for purposes of localization and/or other functions, and/or for other uses. In some embodiments, one or more tree traversal units (TTUs) may be used for executing one or more ray-tracing related operations.

The accelerator(s) 714 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 766 output that correlates with the vehicle 700 orientation, distance, 3D location estimates of the object obtained from the neural network and/or other sensors (e.g., LiDAR sensor(s) 764 or RADAR sensor(s) 760), among others.

The SoC(s) 704 may include data store(s) 716 (e.g., memory). The data store(s) 716 may be on-chip memory of the SoC(s) 704, which may store neural networks to be executed on the GPU and/or the DLA. In some examples, the data store(s) 716 may be large enough in capacity to store multiple instances of neural networks for redundancy and safety. The data store(s) 712 may comprise L2 or L3 cache(s) 712. Reference to the data store(s) 716 may include reference to the memory associated with the PVA, DLA, and/or other accelerator(s) 714, as described herein.

The SoC(s) 704 may include one or more processor(s) 710 (e.g., embedded processors). The processor(s) 710 may include a boot and power management processor that may be a dedicated processor and subsystem to handle boot power and management functions and related security enforcement. The boot and power management processor may be a part of the SoC(s) 704 boot sequence and may provide runtime power management services. The boot power and management processor may provide clock and voltage programming, assistance in system low power state transitions, management of SoC(s) 704 thermals and temperature sensors, and/or management of the SoC(s) 704 power states. Each temperature sensor may be implemented as a ring-oscillator whose output frequency is proportional to temperature, and the SoC(s) 704 may use the ring-oscillators to detect temperatures of the CPU(s) 706, GPU(s) 708, and/or accelerator(s) 714. If temperatures are determined to exceed a threshold, the boot and power management processor may enter a temperature fault routine and put the SoC(s) 704 into a lower power state and/or put the vehicle 700 into a chauffeur to safe stop mode (e.g., bring the vehicle 700 to a safe stop).

The processor(s) 710 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 710 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 710 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 710 may further include a real-time camera engine that may include a dedicated processor subsystem for handling real-time camera management.

The processor(s) 710 may further include a high-dynamic range signal processor that may include an image signal processor that is a hardware engine that is part of the camera processing pipeline.

The processor(s) 710 may include a video image compositor that may be a processing block (e.g., implemented on a microprocessor) that implements video post-processing functions needed by a video playback application to produce the final image for the player window. The video image compositor may perform lens distortion correction on wide-view camera(s) 770, surround camera(s) 774, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 708 is not required to continuously render new surfaces. Even when the GPU(s) 708 is powered on and active doing 3D rendering, the video image compositor may be used to offload the GPU(s) 708 to improve performance and responsiveness.

The SoC(s) 704 may further include a mobile industry processor interface (MIPI) camera serial interface for receiving video and input from cameras, a high-speed interface, and/or a video input block that may be used for camera and related pixel input functions. The SoC(s) 704 may further include an input/output controller(s) that may be controlled by software and may be used for receiving I/O signals that are uncommitted to a specific role.

The SoC(s) 704 may further include a broad range of peripheral interfaces to enable communication with peripherals, audio codecs, power management, and/or other devices. The SoC(s) 704 may be used to process data from cameras (e.g., connected over Gigabit Multimedia Serial Link and Ethernet), sensors (e.g., LiDAR sensor(s) 764, RADAR sensor(s) 760, etc. that may be connected over Ethernet), data from bus 702 (e.g., speed of vehicle 700, steering wheel position, etc.), data from GNSS sensor(s) 758 (e.g., connected over Ethernet or CAN bus). The SoC(s) 704 may further include dedicated high-performance mass storage controllers that may include their own DMA engines, and that may be used to free the CPU(s) 706 from routine data management tasks.

The SoC(s) 704 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 704 may be faster, more reliable, and even more energy-efficient and space-efficient than conventional systems. For example, the accelerator(s) 714, when combined with the CPU(s) 706, the GPU(s) 708, and the data store(s) 716, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 720) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex. The DLA may further utilize metrics associated with sensor performance as input into one or more neural networks.

As another example, multiple neural networks may be run simultaneously, as is required for Level 3, 4, or 7 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 708.

In some examples, a CNN for facial recognition and vehicle owner identification may use data from camera sensors to identify the presence of an authorized driver and/or owner of the vehicle 700. The always on sensor processing engine may be used to unlock the vehicle when the owner approaches the driver door and turn on the lights, and, in security mode, to disable the vehicle when the owner leaves the vehicle. In this way, the SoC(s) 704 provide for security against theft and/or carjacking.

In another example, a CNN for emergency vehicle detection and identification may use data from microphones 796 to detect and identify emergency vehicle sirens. In contrast to conventional systems, that use general classifiers to detect sirens and manually extract features, the SoC(s) 704 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 758. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 762, until the emergency vehicle(s) passes.

The vehicle may include a CPU(s) 718 (e.g., discrete CPU(s), or dCPU(s)), that may be coupled to the SoC(s) 704 via a high-speed interconnect (e.g., PCIe). The CPU(s) 718 may include an X86 processor, for example. The CPU(s) 718 may be used to perform any of a variety of functions, including arbitrating potentially inconsistent results between ADAS sensors and the SoC(s) 704, and/or monitoring the status and health of the controller(s) 736 and/or infotainment SoC 730, for example.

The vehicle 700 may include a GPU(s) 720 (e.g., discrete GPU(s), or dGPU(s)), that may be coupled to the SoC(s) 704 via a high-speed interconnect (e.g., NVIDIA's NVLINK). The GPU(s) 720 may provide additional artificial intelligence functionality, such as by executing redundant and/or different neural networks, and may be used to train and/or update neural networks based on input (e.g., sensor data) from sensors of the vehicle 700.

The vehicle 700 may further include the network interface 724 which may include one or more wireless antennas 726 (e.g., one or more wireless antennas for different communication protocols, such as a cellular antenna, a Bluetooth antenna, etc.). The network interface 724 may be used to enable wireless connectivity over the Internet with the cloud (e.g., with the server(s) 778 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 700 information about vehicles in proximity to the vehicle 700 (e.g., vehicles in front of, on the side of, and/or behind the vehicle 700). This functionality may be part of a cooperative adaptive cruise control functionality of the vehicle 700.

The network interface 724 may include a SoC that provides modulation and demodulation functionality and enables the controller(s) 736 to communicate over wireless networks. The network interface 724 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 700 may further include data store(s) 728 which may include off-chip (e.g., off the SoC(s) 704) storage. The data store(s) 728 may include one or more storage elements including RAM, SRAM, DRAM, VRAM, Flash, hard disks, and/or other components and/or devices that may store at least one bit of data.

The vehicle 700 may further include GNSS sensor(s) 758. The GNSS sensor(s) 758 (e.g., GPS, assisted GPS sensors, differential GPS (DGPS) sensors, etc.), to assist in mapping, perception, occupancy grid generation, and/or path planning functions. Any number of GNSS sensor(s) 758 may be used, including, for example and without limitation, a GPS using a USB connector with an Ethernet to Serial (RS-232) bridge.

The vehicle 700 may further include RADAR sensor(s) 760. The RADAR sensor(s) 760 may be used by the vehicle 700 for long-range vehicle detection, even in darkness and/or severe weather conditions. RADAR functional safety levels may be ASIL B. The RADAR sensor(s) 760 may use the CAN and/or the bus 702 (e.g., to transmit data generated by the RADAR sensor(s) 760) for control and to access object tracking data, with access to Ethernet to access raw data in some examples. A wide variety of RADAR sensor types may be used. For example, and without limitation, the RADAR sensor(s) 760 may be suitable for front, rear, and side RADAR use. In some example, Pulse Doppler RADAR sensor(s) are used.

The RADAR sensor(s) 760 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 760 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 700 surroundings at higher speeds with minimal interference from traffic in adjacent lanes. The other two antennae may expand the field of view, making it possible to quickly detect vehicles entering or leaving the vehicle's 700 lane.

Mid-range RADAR systems may include, as an example, a range of up to 760 m (front) or 80 m (rear), and a field of view of up to 42 degrees (front) or 750 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 700 may further include ultrasonic sensor(s) 762. The ultrasonic sensor(s) 762, which may be positioned at the front, back, and/or the sides of the vehicle 700, may be used for park assist and/or to create and update an occupancy grid. A wide variety of ultrasonic sensor(s) 762 may be used, and different ultrasonic sensor(s) 762 may be used for different ranges of detection (e.g., 2.5 m, 4 m). The ultrasonic sensor(s) 762 may operate at functional safety levels of ASIL B.

The vehicle 700 may include LiDAR sensor(s) 764. The LiDAR sensor(s) 764 may be used for object and pedestrian detection, emergency braking, collision avoidance, and/or other functions. The LiDAR sensor(s) 764 may be functional safety level ASIL B. In some examples, the vehicle 700 may include multiple LiDAR sensors 764 (e.g., two, four, six, etc.) that may use Ethernet (e.g., to provide data to a Gigabit Ethernet switch).

In some examples, the LiDAR sensor(s) 764 may be capable of providing a list of objects and their distances for a 360-degree field of view. Commercially available LiDAR sensor(s) 764 may have an advertised range of approximately 700 m, with an accuracy of 2 cm-3 cm, and with support for a 700 Mbps Ethernet connection, for example. In some examples, one or more non-protruding LiDAR sensors 764 may be used. In such examples, the LiDAR sensor(s) 764 may be implemented as a small device that may be embedded into the front, rear, sides, and/or corners of the vehicle 700. The LiDAR sensor(s) 764, in such examples, may provide up to a 120-degree horizontal and 35-degree vertical field-of-view, with a 200 m range even for low-reflectivity objects. Front-mounted LiDAR sensor(s) 764 may be configured for a horizontal field of view between 45 degrees and 135 degrees.

In some examples, LiDAR technologies, such as 3D flash LiDAR, may also be used. 3D Flash LiDAR uses a flash of a laser as a transmission source, to illuminate vehicle surroundings up to approximately 200 m. A flash LiDAR unit includes a receptor, which records the laser pulse transit time and the reflected light on each pixel, which in turn corresponds to the range from the vehicle to the objects. Flash LiDAR may allow for highly accurate and distortion-free images of the surroundings to be generated with every laser flash. In some examples, four flash LiDAR sensors may be deployed, one at each side of the vehicle 700. Available 3D flash LiDAR systems include a solid-state 3D staring array LiDAR camera with no moving parts other than a fan (e.g., a non-scanning LiDAR device). The flash LiDAR device may use a 7 nanosecond class I (eye-safe) laser pulse per frame and may capture the reflected laser light in the form of 3D range point clouds and co-registered intensity data. By using flash LiDAR, and because flash LiDAR is a solid-state device with no moving parts, the LiDAR sensor(s) 764 may be less susceptible to motion blur, vibration, and/or shock.

The vehicle may further include IMU sensor(s) 766. The IMU sensor(s) 766 may be located at a center of the rear axle of the vehicle 700, in some examples. The IMU sensor(s) 766 may include, for example and without limitation, an accelerometer(s), a magnetometer(s), a gyroscope(s), a magnetic compass(es), and/or other sensor types. In some examples, such as in six-axis applications, the IMU sensor(s) 766 may include accelerometers and gyroscopes, while in nine-axis applications, the IMU sensor(s) 766 may include accelerometers, gyroscopes, and magnetometers.

In some embodiments, the IMU sensor(s) 766 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 766 may enable the vehicle 700 to estimate heading without requiring input from a magnetic sensor by directly observing and correlating the changes in velocity from GPS to the IMU sensor(s) 766. In some examples, the IMU sensor(s) 766 and the GNSS sensor(s) 758 may be combined in a single integrated unit.

The vehicle may include microphone(s) 796 placed in and/or around the vehicle 700. The microphone(s) 796 may be used for emergency vehicle detection and identification, among other things.

The vehicle may further include any number of camera types, including stereo camera(s) 768, wide-view camera(s) 770, infrared camera(s) 772, surround camera(s) 774, long-range and/or mid-range camera(s) 798, and/or other camera types. The cameras may be used to capture image data around an entire periphery of the vehicle 700. The types of cameras used depends on the embodiments and requirements for the vehicle 700, and any combination of camera types may be used to provide the necessary coverage around the vehicle 700. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 7A and FIG. 7B.

The vehicle 700 may further include vibration sensor(s) 742. The vibration sensor(s) 742 may measure vibrations of components of the vehicle, such as the axle(s). For example, changes in vibrations may indicate a change in road surfaces. In another example, when two or more vibration sensors 742 are used, the differences between the vibrations may be used to determine friction or slippage of the road surface (e.g., when the difference in vibration is between a power-driven axle and a freely rotating axle).

The vehicle 700 may include an ADAS system 738. The ADAS system 738 may include a SoC, in some examples. The ADAS system 738 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 760, LiDAR sensor(s) 764, and/or a camera(s). The ACC systems may include longitudinal ACC and/or lateral ACC. Longitudinal ACC monitors and controls the distance to the vehicle immediately ahead of the vehicle 700 and automatically adjust the vehicle speed to maintain a safe distance from vehicles ahead. Lateral ACC performs distance keeping, and advises the vehicle 700 to change lanes when necessary. Lateral ACC is related to other ADAS applications such as LCA and CWS.

CACC uses information from other vehicles that may be received via the network interface 724 and/or the wireless antenna(s) 726 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 700), while the I2V communication concept provides information about traffic further ahead. CACC systems may include either or both I2V and V2V information sources. Given the information of the vehicles ahead of the vehicle 700, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 760, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 760, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 700 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 700 if the vehicle 700 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 760, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 700 is backing up. Some RCTW systems include AEB to ensure that the vehicle brakes are applied to avoid a crash. RCTW systems may use one or more rear-facing RADAR sensor(s) 760, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 700, the vehicle 700 itself must, in the case of conflicting results, decide whether to heed the result from a primary computer or a secondary computer (e.g., a first controller 736 or a second controller 736). For example, in some embodiments, the ADAS system 738 may be a backup and/or secondary computer for providing perception information to a backup computer rationality module. The backup computer rationality monitor may run a redundant diverse software on hardware components to detect faults in perception and dynamic driving tasks. Outputs from the ADAS system 738 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 704.

In other examples, ADAS system 738 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 738 may be fed into the primary computer's perception block and/or the primary computer's dynamic driving task block. For example, if the ADAS system 738 indicates a forward crash warning due to an object immediately ahead, the perception block may use this information when identifying objects. In other examples, the secondary computer may have its own neural network which is trained and thus reduces the risk of false positives, as described herein.

The vehicle 700 may further include the infotainment SoC 730 (e.g., an in-vehicle infotainment system (IVI)). Although illustrated and described as a SoC, the infotainment system may not be a SoC, and may include two or more discrete components. The infotainment SoC 730 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 700. For example, the infotainment SoC 730 may radios, disk players, navigation systems, video players, USB and Bluetooth connectivity, carputers, in-car entertainment, Wi-Fi, steering wheel audio controls, hands free voice control, a heads-up display (HUD), an HMI display 734, a telematics device, a control panel (e.g., for controlling and/or interacting with various components, features, and/or systems), and/or other components. The infotainment SoC 730 may further be used to provide information (e.g., visual and/or audible) to a user(s) of the vehicle, such as information from the ADAS system 738, autonomous driving information such as planned vehicle maneuvers, trajectories, surrounding environment information (e.g., intersection information, vehicle information, road information, etc.), and/or other information.

The infotainment SoC 730 may include GPU functionality. The infotainment SoC 730 may communicate over the bus 702 (e.g., CAN bus, Ethernet, etc.) with other devices, systems, and/or components of the vehicle 700. In some examples, the infotainment SoC 730 may be coupled to a supervisory MCU such that the GPU of the infotainment system may perform some self-driving functions in the event that the primary controller(s) 736 (e.g., the primary and/or backup computers of the vehicle 700) fail. In such an example, the infotainment SoC 730 may put the vehicle 700 into a chauffeur to safe stop mode, as described herein.

The vehicle 700 may further include an instrument cluster 732 (e.g., a digital dash, an electronic instrument cluster, a digital instrument panel, etc.). The instrument cluster 732 may include a controller and/or supercomputer (e.g., a discrete controller or supercomputer). The instrument cluster 732 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 730 and the instrument cluster 732. In other words, the instrument cluster 732 may be included as part of the infotainment SoC 730, or vice versa.

FIG. 7D is a system diagram for communication between cloud-based server(s) and the example autonomous vehicle 700 of FIG. 7A, in accordance with some embodiments of the present disclosure. The system 776 may include server(s) 778, network(s) 790, and vehicles, including the vehicle 700. The server(s) 778 may include a plurality of GPUs 784(A)-584(H) (collectively referred to herein as GPUs 784), PCIe switches 782(A)-582(H)(collectively referred to herein as PCIe switches 782), and/or CPUs 780(A)-580(B) (collectively referred to herein as CPUs 780). The GPUs 784, the CPUs 780, and the PCIe switches may be interconnected with high-speed interconnects such as, for example and without limitation, NVLink interfaces 788 developed by NVIDIA and/or PCIe connections 786. In some examples, the GPUs 784 are connected via NVLink and/or NVSwitch SoC and the GPUs 784 and the PCIe switches 782 are connected via PCIe interconnects. Although eight GPUs 784, two CPUs 780, and two PCIe switches are illustrated, this is not intended to be limiting. Depending on the embodiment, each of the server(s) 778 may include any number of GPUs 784, CPUs 780, and/or PCIe switches. For example, the server(s) 778 may each include eight, sixteen, thirty-two, and/or more GPUs 784.

The server(s) 778 may receive, over the network(s) 790 and from the vehicles, image data representative of images showing unexpected or changed road conditions, such as recently commenced road-work. The server(s) 778 may transmit, over the network(s) 790 and to the vehicles, neural networks 792, updated neural networks 792, and/or map information 794, including information regarding traffic and road conditions. The updates to the map information 794 may include updates for the HD map 722, such as information regarding construction sites, potholes, detours, flooding, and/or other obstructions. In some examples, the neural networks 792, the updated neural networks 792, and/or the map information 794 may have resulted from new training and/or experiences represented in data received from any number of vehicles in the environment, and/or based on training performed at a datacenter (e.g., using the server(s) 778 and/or other servers).

The server(s) 778 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 790, and/or the machine learning models may be used by the server(s) 778 to remotely monitor the vehicles.

In some examples, the server(s) 778 may receive data from the vehicles and apply the data to up-to-date real-time neural networks for real-time intelligent inferencing. The server(s) 778 may include deep-learning supercomputers and/or dedicated AI computers powered by GPU(s) 784, such as a DGX and DGX Station machines developed by NVIDIA. However, in some examples, the server(s) 778 may include deep learning infrastructure that use only CPU-powered datacenters.

The deep-learning infrastructure of the server(s) 778 may be capable of fast, real-time inferencing, and may use that capability to evaluate and verify the health of the processors, software, and/or associated hardware in the vehicle 700. For example, the deep-learning infrastructure may receive periodic updates from the vehicle 700, such as a sequence of images and/or objects that the vehicle 700 has located in that sequence of images (e.g., via computer vision and/or other machine learning object classification techniques). The deep-learning infrastructure may run its own neural network to identify the objects and compare them with the objects identified by the vehicle 700 and, if the results do not match and the infrastructure concludes that the AI in the vehicle 700 is malfunctioning, the server(s) 778 may transmit a signal to the vehicle 700 instructing a fail-safe computer of the vehicle 700 to assume control, notify the passengers, and complete a safe parking maneuver.

For inferencing, the server(s) 778 may include the GPU(s) 784 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAS, and other processors may be used for inferencing.

Example Computing Device

Figure 8:
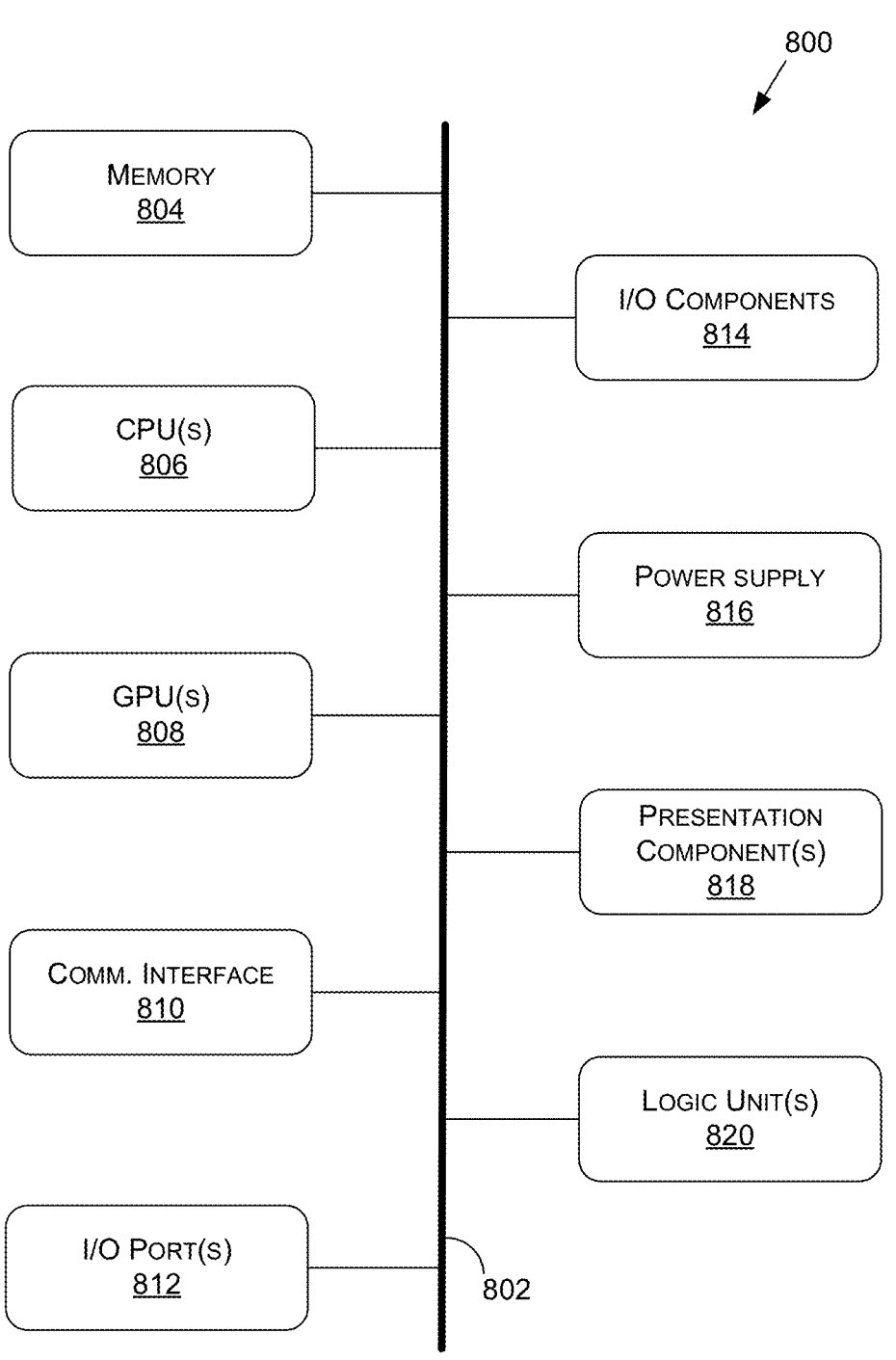
FIG. 8 is a block diagram of an example computing device suitable for use in implementing some embodiments of the present disclosure.

FIG. 8 is a block diagram of an example computing device(s) 800 suitable for use in implementing some embodiments of the present disclosure. Computing device 800 may include an interconnect system 802 that directly or indirectly couples the following devices: memory 804, one or more central processing units (CPUs) 806, one or more graphics processing units (GPUs) 808, a communication interface 810, input/output (I/O) ports 812, input/output components 814, a power supply 816, one or more presentation components 818 (e.g., display(s)), and one or more logic units 820. In at least one embodiment, the computing device(s) 800 may comprise one or more virtual machines (VMs), and/or any of the components thereof may comprise virtual components (e.g., virtual hardware components). For non-limiting examples, one or more of the GPUs 808 may comprise one or more vGPUs, one or more of the CPUs 806 may comprise one or more vCPUs, and/or one or more of the logic units 820 may comprise one or more virtual logic units. As such, a computing device(s) 800 may include discrete components (e.g., a full GPU dedicated to the computing device 800), virtual components (e.g., a portion of a GPU dedicated to the computing device 800), or a combination thereof.

Although the various blocks of FIG. 8 are shown as connected via the interconnect system 802 with lines, this is not intended to be limiting and is for clarity only. For example, in some embodiments, a presentation component 818, such as a display device, may be considered an I/O component 814 (e.g., if the display is a touch screen). As another example, the CPUs 806 and/or GPUs 808 may include memory (e.g., the memory 804 may be representative of a storage device in addition to the memory of the GPUs 808, the CPUs 806, and/or other components). In other words, the computing device of FIG. 8 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 8.

The interconnect system 802 may represent one or more links or busses, such as an address bus, a data bus, a control bus, or a combination thereof. The interconnect system 802 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 806 may be directly connected to the memory 804. Further, the CPU 806 may be directly connected to the GPU 808. Where there is direct, or point-to-point connection between components, the interconnect system 802 may include a PCIe link to carry out the connection. In these examples, a PCI bus need not be included in the computing device 800.

The memory 804 may include any of a variety of computer-readable media. The computer-readable media may be any available media that may be accessed by the computing device 800. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 804 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 800. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 806 may be configured to execute at least some of the computer-readable instructions to control one or more components of the computing device 800 to perform one or more of the methods and/or processes described herein. The CPU(s) 806 may each include one or more cores (e.g., one, two, four, eight, twenty-eight, seventy-two, etc.) that are capable of handling a multitude of software threads simultaneously. The CPU(s) 806 may include any type of processor, and may include different types of processors depending on the type of computing device 800 implemented (e.g., processors with fewer cores for mobile devices and processors with more cores for servers). For example, depending on the type of computing device 800, the processor may be an Advanced RISC Machines (ARM) processor implemented using Reduced Instruction Set Computing (RISC) or an x86 processor implemented using Complex Instruction Set Computing (CISC). The computing device 800 may include one or more CPUs 806 in addition to one or more microprocessors or supplementary co-processors, such as math co-processors.

In addition to or alternatively from the CPU(s) 806, the GPU(s) 808 may be configured to execute at least some of the computer-readable instructions to control one or more components of the computing device 800 to perform one or more of the methods and/or processes described herein. One or more of the GPU(s) 808 may be an integrated GPU (e.g., with one or more of the CPU(s) 806 and/or one or more of the GPU(s) 808 may be a discrete GPU. In embodiments, one or more of the GPU(s) 808 may be a coprocessor of one or more of the CPU(s) 806. The GPU(s) 808 may be used by the computing device 800 to render graphics (e.g., 3D graphics) or perform general purpose computations. For example, the GPU(s) 808 may be used for General-Purpose computing on GPUs (GPGPU). The GPU(s) 808 may include hundreds or thousands of cores that are capable of handling hundreds or thousands of software threads simultaneously. The GPU(s) 808 may generate pixel data for output images in response to rendering commands (e.g., rendering commands from the CPU(s) 806 received via a host interface). The GPU(s) 808 may include graphics memory, such as display memory, for storing pixel data or any other suitable data, such as GPGPU data. The display memory may be included as part of the memory 804. The GPU(s) 808 may include two or more GPUs operating in parallel (e.g., via a link). The link may directly connect the GPUs (e.g., using NVLINK) or may connect the GPUs through a switch (e.g., using NVSwitch). When combined together, each GPU 808 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 806 and/or the GPU(s) 808, the logic unit(s) 820 may be configured to execute at least some of the computer-readable instructions to control one or more components of the computing device 800 to perform one or more of the methods and/or processes described herein. In embodiments, the CPU(s) 806, the GPU(s) 808, and/or the logic unit(s) 820 may discretely or jointly perform any combination of the methods, processes and/or portions thereof. One or more of the logic units 820 may be part of and/or integrated in one or more of the CPU(s) 806 and/or the GPU(s) 808 and/or one or more of the logic units 820 may be discrete components or otherwise external to the CPU(s) 806 and/or the GPU(s) 808. In embodiments, one or more of the logic units 820 may be a coprocessor of one or more of the CPU(s) 806 and/or one or more of the GPU(s) 808.

Examples of the logic unit(s) 820 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

In various embodiments, one or more CPU(s) 806, GPU(s) 808, and/or logic unit(s) 820 are configured to execute one or more instances of fusion engine 122 and/or tracking engine 124. Cross-camera object associations 214, object state information 230, and output objects 240 generated by fusion engine 122 and/or tracking engine 124 can then be used to perform additional processing such as planning and control functions.

The communication interface 810 may include one or more receivers, transmitters, and/or transceivers that enable the computing device 800 to communicate with other computing devices via an electronic communication network, included wired and/or wireless communications. The communication interface 810 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 820 and/or communication interface 810 may include one or more data processing units (DPUs) to transmit data received over a network and/or through interconnect system 802 directly to (e.g., a memory of) one or more GPU(s) 808.

The I/O ports 812 may enable the computing device 800 to be logically coupled to other devices including the I/O components 814, the presentation component(s) 818, and/or other components, some of which may be built in to (e.g., integrated in) the computing device 800. Illustrative I/O components 814 include a microphone, mouse, keyboard, joystick, game pad, game controller, satellite dish, scanner, printer, wireless device, etc. The I/O components 814 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail herein) associated with a display of the computing device 800. The computing device 800 may be include depth cameras, such as stereoscopic camera systems, infrared camera systems, RGB camera systems, touchscreen technology, and combinations of these, for gesture detection and recognition. Additionally, the computing device 800 may include accelerometers or gyroscopes (e.g., as part of an inertia measurement unit (IMU)) that enable detection of motion. In some examples, the output of the accelerometers or gyroscopes may be used by the computing device 800 to render immersive augmented reality or virtual reality.

The power supply 816 may include a hard-wired power supply, a battery power supply, or a combination thereof.

The power supply 816 may provide power to the computing device 800 to enable the components of the computing device 800 to operate.

The presentation component(s) 818 may include a display (e.g., a monitor, a touch screen, a television screen, a heads-up-display (HUD), other display types, or a combination thereof), speakers, and/or other presentation components. The presentation component(s) 818 may receive data from other components (e.g., the GPU(s) 808, the CPU(s) 806, DPUs, etc.), and output the data (e.g., as an image, video, sound, etc.).

Example Data Center

Figure 9:
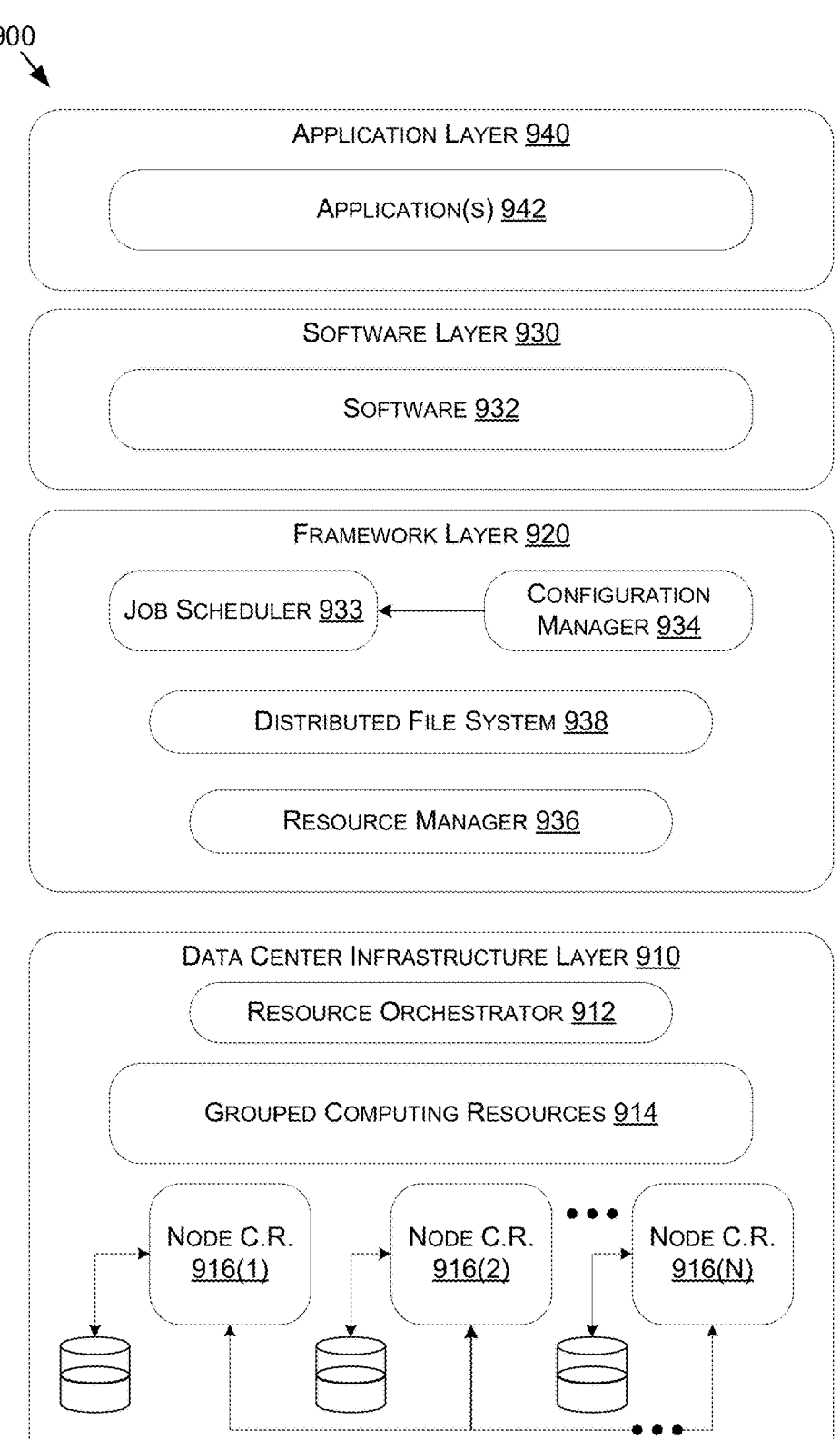
FIG. 9 is a block diagram of an example data center suitable for use in implementing some embodiments of the present disclosure.

FIG. 9 illustrates an example data center 900 that may be used in at least one embodiments of the present disclosure. The data center 900 may include a data center infrastructure layer 910, a framework layer 920, a software layer 930, and/or an application layer 940.

As shown in FIG. 9, the data center infrastructure layer 910 may include a resource orchestrator 912, grouped computing resources 914, and node computing resources ("node C.R.s") 916(1)-716(N), where "N" represents any whole, positive integer. In at least one embodiment, node C.R.s 916(1)-716(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 916(1)-716(N) may correspond to a server having one or more of the above-mentioned computing resources. In addition, in some embodiments, the node C.R.s 916(1)-716(N) may include one or more virtual components, such as vGPUs, vCPUs, and/or the like, and/or one or more of the node C.R.s 916(1)-716(N) may correspond to a virtual machine (VM).

In at least one embodiment, grouped computing resources 914 may include separate groupings of node C.R.s 916 housed within one or more racks (not shown), or many racks housed in data centers at various geographical locations (also not shown). Separate groupings of node C.R.s 916 within grouped computing resources 914 may include grouped compute, network, memory or storage resources that may be configured or allocated to support one or more workloads. In at least one embodiment, several node C.R.s 916 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 912 may configure or otherwise control one or more node C.R.s 916(1)-716(N) and/or grouped computing resources 914. In at least one embodiment, resource orchestrator 912 may include a software design infrastructure (SDI) management entity for the data center 900. The resource orchestrator 912 may include hardware, software, or some combination thereof.

In at least one embodiment, as shown in FIG. 9, framework layer 920 may include a job scheduler 933, a configuration manager 934, a resource manager 936, and/or a distributed file system 938. The framework layer 920 may include a framework to support software 932 of software layer 930 and/or one or more application(s) 942 of application layer 940. The software 932 or application(s) 942 may respectively include web-based service software or applications, such as those provided by Amazon Web Services, Google Cloud and Microsoft Azure. The framework layer 920 may be, but is not limited to, a type of free and open-source software web application framework such as Apache Spark™ (hereinafter "Spark") that may utilize distributed file system 938 for large-scale data processing (e.g., "big data"). In at least one embodiment, job scheduler 933 may include a Spark driver to facilitate scheduling of workloads supported by various layers of data center 900. The configuration manager 934 may be capable of configuring different layers such as software layer 930 and framework layer 920 including Spark and distributed file system 938 for supporting large-scale data processing. The resource manager 936 may be capable of managing clustered or grouped computing resources mapped to or allocated for support of distributed file system 938 and job scheduler 933. In at least one embodiment, clustered or grouped computing resources may include grouped computing resource 914 at data center infrastructure layer 910. The resource manager 936 may coordinate with resource orchestrator 912 to manage these mapped or allocated computing resources.

In at least one embodiment, software 932 included in software layer 930 may include software used by at least portions of node C.R.s 916(1)-716(N), grouped computing resources 914, and/or distributed file system 938 of framework layer 920. One or more types of software may include, but are not limited to, Internet web page search software, e-mail virus scan software, database software, and streaming video content software.

In at least one embodiment, application(s) 942 included in application layer 940 may include one or more types of applications used by at least portions of node C.R.s 916(1)-716(N), grouped computing resources 914, and/or distributed file system 938 of framework layer 920. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 934, resource manager 936, and resource orchestrator 912 may implement any number and type of self-modifying actions based on any amount and type of data acquired in any technically feasible fashion. Self-modifying actions may relieve a data center operator of data center 900 from making possibly bad configuration decisions and possibly avoiding underutilized and/or poor performing portions of a data center.

The data center 900 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described herein with respect to the data center 900. In at least one embodiment, trained or deployed machine learning models corresponding to one or more neural networks may be used to infer or predict information using resources described herein with respect to the data center 900 by using weight parameters calculated through one or more training techniques, such as but not limited to those described herein.

In at least one embodiment, the data center 900 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described herein may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 800 of FIG. 8—e.g., each device may include similar components, features, and/or functionality of the computing device(s) 800. In addition, where backend devices (e.g., servers, NAS, etc.) are implemented, the backend devices may be included as part of a data center 900, an example of which is described in more detail herein with respect to FIG. 9.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 800 described herein with respect to FIG. 8. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

In sum, the disclosed techniques generate object tracking information based on input objects received from multiple sensors, such as cameras, using low-latency operations. A processing engine performs three-dimensional (3D) sensor fusion and object tracking operations that generate a set of output objects based on the input objects and/or images, such that each physical object is represented by one output object in the set of output objects. Upon identifying a set of input objects in sensor input, such as one or more camera images, the processing engine performs an object association operation that partitions the set of input objects into subsets based on comparisons between characteristics of the input objects. Each input object subset contains one or more input objects, and each input object represents the same physical object from a different respective camera.

The object association algorithm identifies input object subsets that correspond to the same physical object using a cost optimization algorithm to identify a minimum cost set of cliques of nodes in a graph. The graph includes a set of nodes, each of which corresponds to an input object, and a set of edges, each of which connects two nodes. A clique is a graph in which each pair of nodes are connected to each other. The nodes in the graph are partitioned into groups such that each group represents a camera. As such, each group includes nodes that represent the objects detected by the camera represented by the group. A physical object is not necessarily captured by every camera, so some groups may contain fewer objects than other groups. To enable calculation of a cost when a physical object is not captured by every camera, one or more "dummy nodes" are added to each group that does not have a sufficient number of nodes to form an edge connection with each node in each of the other groups. After adding the dummy nodes, edges connecting each node to a node in each of the other groups are added to the graph. The cost optimization algorithm evaluates the costs of various subgraphs that contain a node from each group. Since each node represents an input object, each subgraph contains a set of nodes that represent a subset of the input objects. Since each group of nodes represents a camera, the subset contains an input object from each camera. Thus, each input object subset represents a candidate association between objects captured by different cameras that potentially represent the same physical object. The cost optimization algorithm identifies a minimum cost set of cliques in the graph, and each clique in the minimum cost set of cliques contains a set of nodes corresponding to input objects that represent the same physical object. To identify the minimum cost set of cliques in a graph, the cost optimization algorithm calculates a cost for each subgraph that contains a node for each camera and selects a minimum-cost subgraph having the lowest cost according to a cost function, and removes dummy nodes from the selected subgraph to produce a result subgraph. The result subgraph contains a node for each camera that captured an image of the same physical object. The cost optimization algorithm may calculate a cost for each edge based on a difference between characteristics of the input objects represented by the nodes connected by the edge. The cost optimization algorithm addresses limitations in graph-based sensor fusion association algorithms that use a form of bipartite matching and are specialized to work for two cameras.

The processing engine performs object tracking by creating and updating object state information for each input object. The processing engine uses the state information to generate a set of output objects for use by other components of the autonomous vehicle system. The state information maintained by the processing engine includes an object mapping table, current characteristics of each input object, and historical object characteristics received for objects up to a threshold amount of time in the past. The object mapping table contains identifiers of the input objects detected in the current frame from each camera. To generate the output objects, the processing engine combines the input objects in each input object subset (which represent the same physical object) using a smoothing technique to form a single output object having characteristics based on the characteristics of each input object in the subset. The object characteristics may include shape, position, and velocity, for example.

The processing engine determines, for each input object in the mapping table, whether to perform smoothing on the input object. The determination of whether to perform smoothing can be based on whether the input object is in a region where camera views overlap. For example, smoothing can be performed if the input object is in a region where camera views overlap. Alternatively or additionally, the determination of whether to perform smoothing can be based on whether the input object is associated with multiple sensors (e.g., is in images from multiple cameras) in a current frame and/or in historical frames. For example, smoothing can be performed if the input object subset received for the current frame includes more than one input object in the subset, since each input object in the subset is received from a different camera. If smoothing is not to be performed, then the processing engine updates the state information to include the input object's characteristics, which is a low-latency operation. The processing engine then outputs the input object, including the input object's current characteristics, as an output object. If smoothing is to be performed, the processing engine performs a smoothing operation and generates an output object having object characteristics based on object characteristics of the input object and other input objects in the same subset, since each subset represents a physical object. The smoothing operation may averages the object characteristics of each of the input objects in the same subset, for example.

One technical advantage of the disclosed techniques relative to the existing solutions is the ability to output object tracking information with low latency in the common case of an object being in a non-overlapping region. The object tracking information also indicates the appearance and disappearance of an object with low latency. For objects that are in regions where cameras do overlap, the disclosed techniques also output object tracking information with low latency by using an efficient smoothing operation that averages the object characteristics received from multiple cameras based on the state information. These low-latency operations reduce reaction time for objects in the vehicle environment and can provide increased safety relative to existing solutions techniques. Further, since processing resources are devoted to the perception pipelines, and later points in the pipelines are more likely to have fewer errors, the disclosed techniques use the results produced by the DNN without waiting for multiple frames to be passed through the DNN.

1. In some embodiments, a method comprises: determining a plurality of input objects and corresponding object characteristics, individual input objects and respective object characteristics being determined based at least on an image generated using a respective camera of a plurality of cameras; identifying at least one subset of the plurality of input objects, the at least one subset corresponding to a respective physical object and comprising at least one input object that satisfies a similarity criterion; generating an output object associated with one or more smoothed object characteristics, the output object being generated based at least on two or more input objects included in the at least one subset of the plurality of input objects, the given subset corresponding to a physical object that is visible to two or more cameras of the plurality of cameras; and providing the output object to one or more components of a machine.

2. The method of clause 1, wherein the at least one subset is identified from a plurality of subsets based at least on executing a cost optimization algorithm that minimizes a total cost, wherein the total cost is based at least on a plurality of costs, wherein the plurality of costs includes a cost determined for each pair of input objects included in the plurality of input objects, and wherein each pair includes two input objects that are based at least on images generated using different cameras.

3. The method of clause 1 or clause 2, wherein the cost optimization algorithm is performed on a graph comprising nodes and vertices, wherein each camera corresponds to a subset of the nodes, each node corresponds to an input object, and wherein each vertex is associated with the cost between a pair of input objects that are in different subsets of the nodes.

4. The method of any of clauses 1-3, wherein at least one dummy node is included in at least one subset of the nodes, and wherein a vertex between a dummy node and a second node is associated with a default cost.

5. The method of any of clauses 1-4, wherein the plurality of input objects include a first input object associated with a first set of object characteristics and a second input object associated with a second set of object characteristics, and wherein the first input object and the second input object depict the physical object that is visible to two or more cameras.

6. The method of any of clauses 1-5, wherein the smoothed object characteristics are based at least on the first set of object characteristics and the second set of object characteristics.

7. The method of any of clauses 1-6, further comprising: determining that a second given subset corresponds to a second physical object that is visible to one camera; and upon determining that a second given subset corresponds to the second physical object that is visible to one camera, providing a second output object to one or more components, wherein the second output object comprises one or more object characteristics associated with an input object included in the second given subset.

8. The method of any of clauses 1-7, further comprising: upon identifying a plurality of subsets of the plurality of input objects, determining whether an input object in the plurality of input objects is present in a state information data structure; responsive to determining that the input object is not present in the state information data structure, generating a global object identifier; and responsive to generating the global object identifier, storing an entry in the state information, wherein the entry comprises the global object identifier, an object identifier of the input object, a camera identifier that identifies a camera associated with the input object, and one or more object characteristics of the input object.

9. The method of any of clauses 1-8, further comprising: upon identifying the plurality of subsets of the plurality of input objects, determining whether an input object in the plurality of input objects is present in a state information data structure; and responsive to determining that the input object is present in the state information data structure, updating the state information based on at least one or more object characteristics of the input object.

10. The method of any of clauses 1-9, wherein the determining whether the input object in the plurality of input objects is present in the state information data structure comprises: searching the state information data structure for a record that includes the object identifier of the input object and the camera identifier that identifies the camera associated with the input object.

11. The method of any of clauses 1-10, wherein the generating the output object associated with the one or more smoothed object characteristics comprises: identifying, based at least on the given subset, a highest-priority camera of the given subset, wherein the highest-priority camera is associated with at least one input object included in the given subset, wherein the one or more smoothed object characteristics are based at least on one or more object characteristics of at least one input object included in the given subset.

12. The method of any of clauses 1-11, wherein the highest-priority camera of the set of input objects has an associated priority greater than or equal to a priority of each of one or more other cameras, wherein each of the one or more other cameras is associated with one of the other input objects in the input object subset.

13. The method of any of clauses 1-12, wherein the one or more object characteristics of the identified input object are based at least on historical data associated with each input object that is in the given subset.

14. The method of any of clauses 1-13, wherein the one or more object characteristics of the identified input object comprise one or more of a shape, position, velocity, or acceleration of the identified input object.

15. In some embodiments, a processor comprises: one or more processing units to perform operations comprising:

determining a plurality of input objects and corresponding object characteristics, individual input objects and respective object characteristics being determined based at least on an image generated using a respective camera of a plurality of cameras; identifying at least one subset of the plurality of input objects, the at least one subset corresponding to a respective physical object and comprising at least one input object that satisfies a similarity criterion; generating an output object associated with one or more smoothed object characteristics, the output object being generated based at least on two or more input objects included in the at least one subset of the plurality of input objects, the given subset corresponding to a physical object that is visible to two or more cameras of the plurality of cameras; and providing the output object to one or more components of a machine.

16. The processor of clause 15, wherein the at least one subset is identified from a plurality of subsets based at least on executing a cost optimization algorithm that minimizes a total cost, wherein the total cost is based at least on a plurality of costs, wherein the plurality of costs includes a cost determined for each pair of input objects included in the plurality of input objects, and wherein each pair includes two input objects that are based at least on images generated using different cameras.

17. The processor of clause 15 or clause 16, wherein the cost optimization algorithm is performed on a graph comprising nodes and vertices, wherein each camera corresponds to a subset of the nodes, each node corresponds to an input object, and wherein each vertex is associated with the cost between a pair of input objects that are in different subsets of the nodes.

18. The processor of any of clauses 15-17, wherein at least one dummy node is included in at least one subset of the nodes, and wherein a vertex between a dummy node and a second node is associated with a default cost.

19. The processor of clauses 15-18, wherein the processor is comprised in at least one of: a control system for an autonomous or semi-autonomous machine; a perception system for an autonomous or semi-autonomous machine; a system for performing simulation operations; a system for performing digital twin operations; a system for performing light transport simulation; a system for performing collaborative content creation for 3D assets; a system for performing deep learning operations; a system implemented using an edge device; a system for generating or presenting at least one of virtual reality content, augmented reality content, or mixed reality content; a system implemented using a robot; a system for performing conversational AI operations; a system implementing one or more large language models (LLMs); a system for generating synthetic data; a system incorporating one or more virtual machines (VMs); a system implemented at least partially in a data center; or a system implemented at least partially using cloud computing resources.

20. In some embodiments, a system comprises: a memory storing one or more instructions; and one or more processors that execute the one or more instructions to: determine a plurality of input objects and corresponding object characteristics, individual input objects and respective object characteristics being determined based at least on an image generated using a respective camera of a plurality of cameras; identify at least one subset of the plurality of input objects, the at least one subset corresponding to a respective physical object and comprising at least one input object that satisfies a similarity criterion; generate an output object associated with one or more smoothed object characteristics, the output object being generated based at least on two or more input objects included in the at least one subset of the plurality of input objects, the given subset corresponding to a physical object that is visible to two or more cameras of the plurality of cameras; and provide the output object to one or more components of a machine.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method, comprising:
   determining a plurality of input objects and corresponding object characteristics, individual input objects and respective object characteristics being determined based at least on an image generated using a respective camera of a plurality of cameras;
   identifying at least one subset of the plurality of input objects, the at least one subset corresponding to a respective physical object and comprising at least one input object that satisfies a similarity criterion;
   generating an output object associated with one or more smoothed object characteristics, the output object being generated based at least on two or more input objects included in the at least one subset of the plurality of input objects, the given subset corresponding to a physical object that is visible to two or more cameras of the plurality of cameras; and
   providing the output object to one or more components of a machine.

2. The method of claim 1, wherein the at least one subset is identified from a plurality of subsets based at least on executing a cost optimization algorithm that minimizes a total cost, wherein the total cost is based at least on a plurality of costs, wherein the plurality of costs includes a cost determined for each pair of input objects included in the plurality of input objects, and wherein each pair includes two input objects that are based at least on images generated using different cameras.

3. The method of claim 2, wherein the cost optimization algorithm is performed on a graph comprising nodes and vertices, wherein each camera corresponds to a subset of the nodes, each node corresponds to an input object, and wherein each vertex is associated with the cost between a pair of input objects that are in different subsets of the nodes.

4. The method of claim 3, wherein at least one dummy node is included in at least one subset of the nodes, and wherein a vertex between a dummy node and a second node is associated with a default cost.

5. The method of claim 1, wherein the plurality of input objects include a first input object associated with a first set of object characteristics and a second input object associated with a second set of object characteristics, and wherein the first input object and the second input object depict the physical object that is visible to two or more cameras.

6. The method of claim 5, wherein the smoothed object characteristics are based at least on the first set of object characteristics and the second set of object characteristics.

7. The method of claim 1, further comprising:
   determining that a second given subset corresponds to a second physical object that is visible to one camera; and
   upon determining that a second given subset corresponds to the second physical object that is visible to one camera, providing a second output object to one or more components, wherein the second output object comprises one or more object characteristics associated with an input object included in the second given subset.

8. The method of claim 1, further comprising:
   upon identifying a plurality of subsets of the plurality of input objects, determining whether an input object in the plurality of input objects is present in a state information data structure;
   responsive to determining that the input object is not present in the state information data structure, generating a global object identifier; and
   responsive to generating the global object identifier, storing an entry in the state information, wherein the entry comprises the global object identifier, an object identifier of the input object, a camera identifier that identifies a camera associated with the input object, and one or more object characteristics of the input object.

9. The method of claim 1, further comprising:
   upon identifying the plurality of subsets of the plurality of input objects, determining whether an input object in the plurality of input objects is present in a state information data structure; and
   responsive to determining that the input object is present in the state information data structure, updating the state information based on at least one or more object characteristics of the input object.

10. The method of claim 8, wherein the determining whether the input object in the plurality of input objects is present in the state information data structure comprises:

US 12,586,346 B2

59 searching the state information data structure for a record that includes the object identifier of the input object and the camera identifier that identifies the camera associated with the input object.

11. The method of claim 1, wherein the generating the output object associated with the one or more smoothed object characteristics comprises:

identifying, based at least on the given subset, a highest-priority camera of the given subset, wherein the highest-priority camera is associated with at least one input object included in the given subset, wherein the one or more smoothed object characteristics are based at least on one or more object characteristics of at least one input object included in the given subset.

12. The method of claim 11, wherein the highest-priority camera of the set of input objects has an associated priority greater than or equal to a priority of each of one or more other cameras, wherein each of the one or more other cameras is associated with one of the other input objects in the input object subset.

13. The method of claim 11, wherein the one or more object characteristics of the identified input object are based at least on historical data associated with each input object that is in the given subset.

14. The method of claim 11, wherein the one or more object characteristics of the identified input object comprise one or more of a shape, position, velocity, or acceleration of the identified input object.

15. A processor comprising:

one or more processing units to perform operations comprising:

determining a plurality of input objects and corresponding object characteristics, individual input objects and respective object characteristics being determined based at least on an image generated using a respective camera of a plurality of cameras;

identifying at least one subset of the plurality of input objects, the at least one subset corresponding to a respective physical object and comprising at least one input object that satisfies a similarity criterion;

generating an output object associated with one or more smoothed object characteristics, the output object being generated based at least on two or more input objects included in the at least one subset of the plurality of input objects, the given subset corresponding to a physical object that is visible to two or more cameras of the plurality of cameras; and providing the output object to one or more components of a machine.

16. The processor of claim 15, wherein the at least one subset is identified from a plurality of subsets based at least on executing a cost optimization algorithm that minimizes a total cost, wherein the total cost is based at least on a plurality of costs, wherein the plurality of costs includes a cost determined for each pair of input objects included in the plurality of input objects, and wherein each pair includes two input objects that are based at least on images generated using different cameras.

17. The processor of claim 16, wherein the cost optimization algorithm is performed on a graph comprising nodes and vertices, wherein each camera corresponds to a subset of the nodes, each node corresponds to an input object, and wherein each vertex is associated with the cost between a pair of input objects that are in different subsets of the nodes.

18. The processor of claim 17, wherein at least one dummy node is included in at least one subset of the nodes, and wherein a vertex between a dummy node and a second node is associated with a default cost.

19. The processor of claim 15, wherein the processor is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system implemented using an edge device;

a system for generating or presenting at least one of virtual reality content, augmented reality content, or mixed reality content;

a system implemented using a robot;

a system for performing conversational AI operations;

a system implementing one or more large language models (LLMs);

a system for generating synthetic data;

a system incorporating one or more virtual machines (VMs);

a system implemented at least partially in a data center; or a system implemented at least partially using cloud computing resources.

20. A system comprising:

a memory storing one or more instructions; and one or more processors that execute the one or more instructions to:

determine a plurality of input objects and corresponding object characteristics, individual input objects and respective object characteristics being determined based at least on an image generated using a respective camera of a plurality of cameras;

identify at least one subset of the plurality of input objects, the at least one subset corresponding to a respective physical object and comprising at least one input object that satisfies a similarity criterion;

generate an output object associated with one or more smoothed object characteristics, the output object being generated based at least on two or more input objects included in the at least one subset of the plurality of input objects, the given subset corresponding to a physical object that is visible to two or more cameras of the plurality of cameras; and provide the output object to one or more components of a machine.

* * * * *